United States Patent
Bai et al.

(10) Patent No.: US 12,439,469 B2
(45) Date of Patent: Oct. 7, 2025

(54) BEAM RESET IN MULTIPLE TRANSMIT RECEIVE POINT DEPLOYMENTS

(71) Applicant: QUALCOMM Incorporated, San Diego, CA (US)

(72) Inventors: Tianyang Bai, Somerville, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 490 days.

(21) Appl. No.: 17/822,614

(22) Filed: Aug. 26, 2022

(65) Prior Publication Data

US 2023/0144011 A1 May 11, 2023

Related U.S. Application Data

(60) Provisional application No. 63/263,630, filed on Nov. 5, 2021.

(51) Int. Cl.
| | |
|---|---|
| *H04B 7/06* | (2006.01) |
| *H04L 5/00* | (2006.01) |
| *H04W 24/10* | (2009.01) |
| *H04W 72/12* | (2023.01) |
| *H04W 76/19* | (2018.01) |

(52) U.S. Cl.
CPC ................................. *H04W 76/19* (2018.02)

(58) Field of Classification Search
None
See application file for complete search history.

(56) References Cited

U.S. PATENT DOCUMENTS

| | | | |
|---|---|---|---|
| 11,211,990 B2* | 12/2021 | Yi | H04L 5/0023 |
| 12,191,962 B2* | 1/2025 | Yang | H04W 72/23 |
| 12,335,184 B2* | 6/2025 | Yang | H04W 72/046 |
| 2021/0112619 A1 | 4/2021 | Bai et al. | |
| 2021/0282168 A1 | 9/2021 | Matsumura et al. | |
| 2024/0030996 A1* | 1/2024 | Song | H04W 24/04 |
| 2024/0039587 A1* | 2/2024 | Liu | H04B 7/0456 |
| 2024/0138014 A1* | 4/2024 | Jung | H04B 7/06964 |
| 2024/0187199 A1* | 6/2024 | Gao | H04L 5/0094 |
| 2024/0188015 A1* | 6/2024 | Comsa | H04W 56/0045 |
| 2024/0192308 A1* | 6/2024 | Taghizadeh Motlagh | G01S 7/0235 |
| 2024/0259053 A1* | 8/2024 | Canonne-Velasquez | H04B 7/0626 |
| 2024/0283623 A1* | 8/2024 | Jin | H04L 5/0023 |

(Continued)

OTHER PUBLICATIONS

International Search Report and Written Opinion—PCT/US2022/075592—ISA/EPO—Nov. 22, 2022.

*Primary Examiner* — Sithu Ko
(74) *Attorney, Agent, or Firm* — Harrity & Harrity, L.L.P \Qualcomm

(57) ABSTRACT

Various aspects of the present disclosure generally relate to wireless communication. In some aspects, a user equipment (UE) may receive configuration information identifying an association between a transmission configuration indicator (TCI) state and a transmit receive point (TRP). The UE may identify a beam failure associated with the TRP. The UE may communicate with one or more network devices to reset a beam associated with the beam failure, for the TCI state, based at least in part on the association between the TCI and the TRP. Numerous other aspects are described.

20 Claims, 13 Drawing Sheets

(56) References Cited

U.S. PATENT DOCUMENTS

2024/0291547 A1* 8/2024 Matsumura ............ H04B 7/088
2024/0357689 A1* 10/2024 Nilsson ................ H04L 5/0053

* cited by examiner

BEAM RESET IN MULTIPLE TRANSMIT RECEIVE POINT DEPLOYMENTS

CROSS-REFERENCE TO RELATED APPLICATION

This Patent Application claims priority to U.S. Provisional Patent Application No. 63/263,630, filed on Nov. 5, 2021, entitled "BEAM RESET IN MULTIPLE TRANSMIT RECEIVE POINT DEPLOYMENTS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for beam reset in multiple transmit receive point (mTRP) deployments.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving configuration information identifying an association between a transmission configuration indicator (TCI) state and a transmit receive point (TRP). The method may include identifying a beam failure associated with the TRP. The method may include communicating with one or more network devices to reset a beam associated with the beam failure, for the TCI state, based at least in part on the association between the TCI and the TRP.

Some aspects described herein relate to a method of wireless communication performed by a network device. The method may include transmitting configuration information identifying an association between a TCI state and a TRP. The method may include communicating with a UE to reset a beam associated with a beam failure, for the TCI state, based at least in part on the association between the TCI and the TRP.

Some aspects described herein relate to a UE for wireless communication. The UE may include a memory and one or more processors coupled to the memory. The one or more processors may be configured to receive configuration information identifying an association between a TCI state and a TRP. The one or more processors may be configured to identify a beam failure associated with the TRP. The one or more processors may be configured to communicate with one or more network devices to reset a beam associated with the beam failure, for the TCI state, based at least in part on the association between the TCI and the TRP.

Some aspects described herein relate to a network device for wireless communication. The network device may include a memory and one or more processors coupled to the memory. The one or more processors may be configured to transmit configuration information identifying an association between a TCI state and a TRP. The one or more processors may be configured to communicate with a UE to reset a beam associated with a beam failure, for the TCI state, based at least in part on the association between the TCI and the TRP.

Some aspects described herein relate to a non-transitory computer-readable medium that stores a set of instructions for wireless communication by a UE. The set of instructions, when executed by one or more processors of the UE, may cause the UE to receive configuration information identifying an association between a TCI state and a TRP. The set of instructions, when executed by one or more processors of the UE, may cause the UE to identify a beam failure associated with the TRP. The set of instructions, when executed by one or more processors of the UE, may cause the UE to communicate with one or more network devices to reset a beam associated with the beam failure, for the TCI state, based at least in part on the association between the TCI and the TRP.

Some aspects described herein relate to a non-transitory computer-readable medium that stores a set of instructions for wireless communication by a network device. The set of instructions, when executed by one or more processors of the network device, may cause the network device to transmit configuration information identifying an association between a TCI state and a TRP. The set of instructions, when executed by one or more processors of the network device, may cause the network device to communicate with a UE to reset a beam associated with a beam failure, for the TCI state, based at least in part on the association between the TCI and the TRP.

Some aspects described herein relate to an apparatus for wireless communication. The apparatus may include means for receiving configuration information identifying an association between a TCI state and a TRP. The apparatus may include means for identifying a beam failure associated with the TRP. The apparatus may include means for communicating with one or more network devices to reset a beam associated with the beam failure, for the TCI state, based at least in part on the association between the TCI and the TRP.

Some aspects described herein relate to an apparatus for wireless communication. The apparatus may include means for transmitting configuration information identifying an association between a TCI state and a TRP. The apparatus may include means for communicating with a UE to reset a beam associated with a beam failure, for the TCI state, based at least in part on the association between the TCI and the TRP.

Aspects generally include a method, apparatus, system, computer program product, non-transitory computer-readable medium, user equipment, base station, network node, network device, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
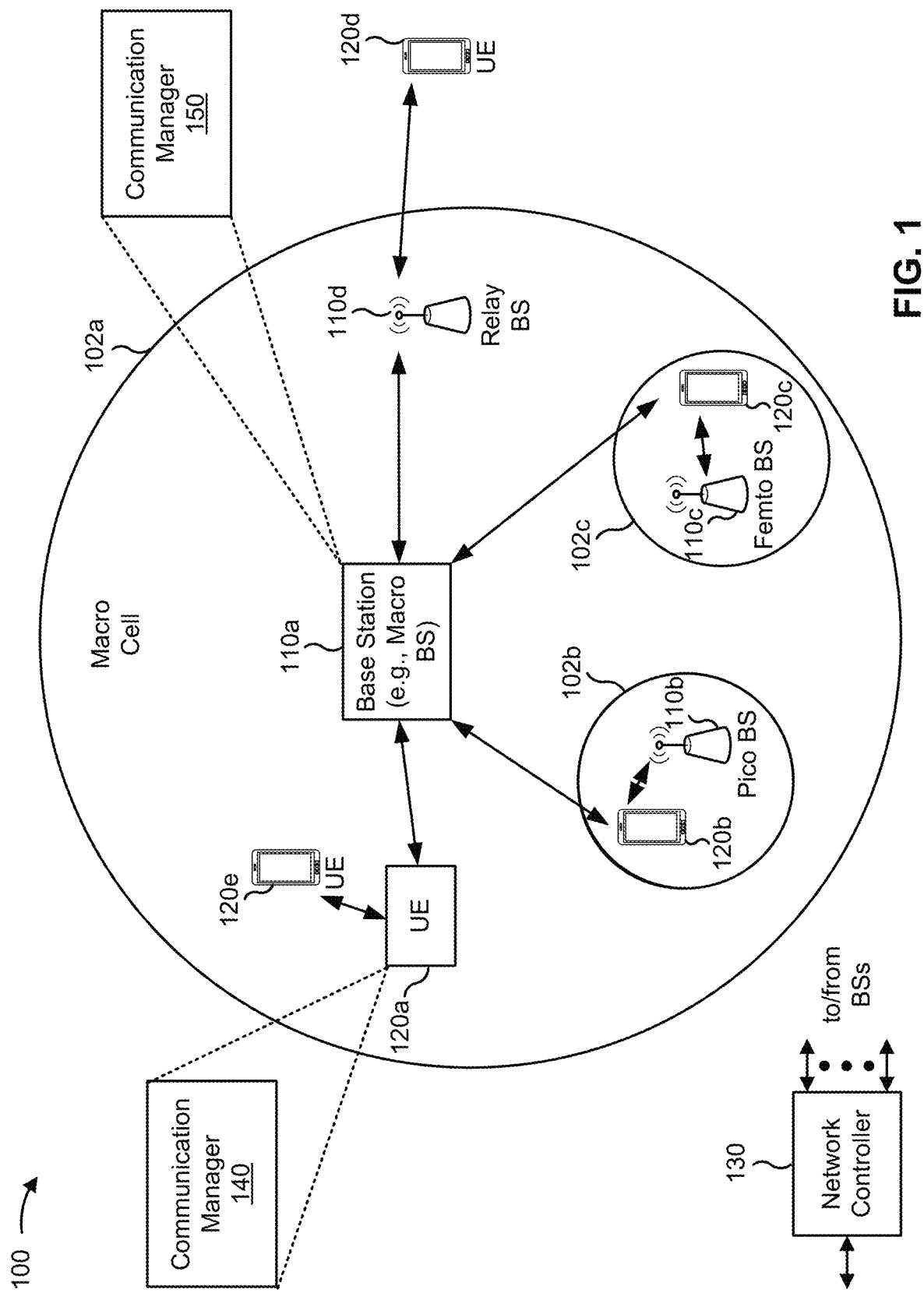
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the terms "base station" (e.g., the base station 110), "network node," "network device," or "network entity" may refer to an aggregated base station, a disaggregated base station (e.g., described in connection with FIG. 13), an integrated access and backhaul (IAB) node, a relay node, and/or one or more components thereof. For example, in some aspects, "base station," "network device," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the terms "base station," "network device," "network node," or "network entity" may refer to one device configured to perform one or more functions, such as those described herein in connection with the base station 110. In some aspects, the terms "base station," "network device," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the terms "base station," "network device," "network node," or "network entity" may refer to any one or more of those different devices. In some aspects, the terms "base station," "network device," "network node," or "network entity" may refer to one or more virtual base stations and/or one or more virtual base station functions. For example, in some aspects, two or more base station functions may be instantiated on a single device. In some aspects, the terms "base station," "network device," "network node," or "network entity" may refer to one of the base station functions and not another. In this way, a single device may include more than one base station.

In some aspects, the UE 120 may include a communication manager 140. As described in more detail elsewhere herein, the communication manager 140 may receive configuration information identifying an association between a transmission configuration indicator (TCI) state and a transmit receive point (TRP); identify a beam failure associated with the TRP; and communicate with one or more network devices to reset a beam associated with the beam failure, for the TCI state, based at least in part on the association between the TCI and the TRP. Additionally, or alternatively, the communication manager 140 may perform one or more other operations described herein.

In some aspects, a network device (e.g., a TRP of the base station 110) may include a communication manager 150. As described in more detail elsewhere herein, the communication manager 150 may transmit configuration information identifying an association between a TCI state and a TRP; communicate with a UE to reset a beam associated with a beam failure, for the TCI state, based at least in part on the association between the TCI and the TRP. Additionally, or alternatively, the communication manager 150 may perform one or more other operations described herein.

As indicated above, FIG. 1 is provided as an example. Other examples may differ from what is described with regard to FIG. 1.

Figure 2:
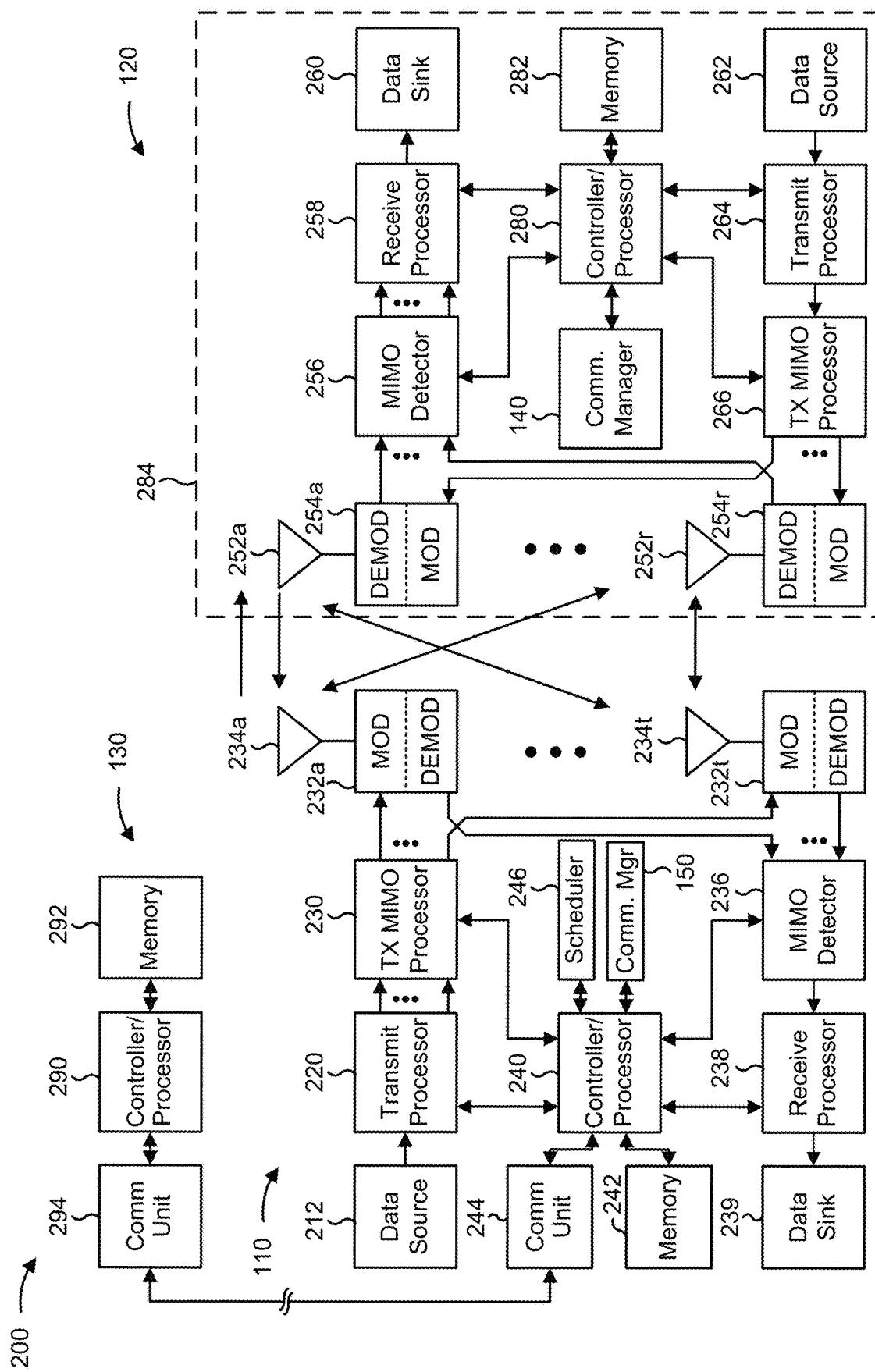
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-12).

The controller/processor 240 of the base station 110, the controller/processor 280 of the UE 120, and/or any other component(s) of FIG. 2 may perform one or more techniques associated with beam reset in mTRP deployments, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE includes means for receiving configuration information identifying an association between a TCI state and a TRP; means for identifying a beam failure associated with the TRP; and/or means for communicating with one or more network devices to reset a beam associated with the beam failure, for the TCI state, based at least in part on the association between the TCI and the TRP. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network device (e.g., the base station 110) includes means for transmitting configuration information identifying an association between a TCI state and a TRP; means for communicating with a UE to reset a beam associated with a beam failure, for the TCI state, based at least in part on the association between the TCI and the TRP. In some aspects, the means for the network device to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
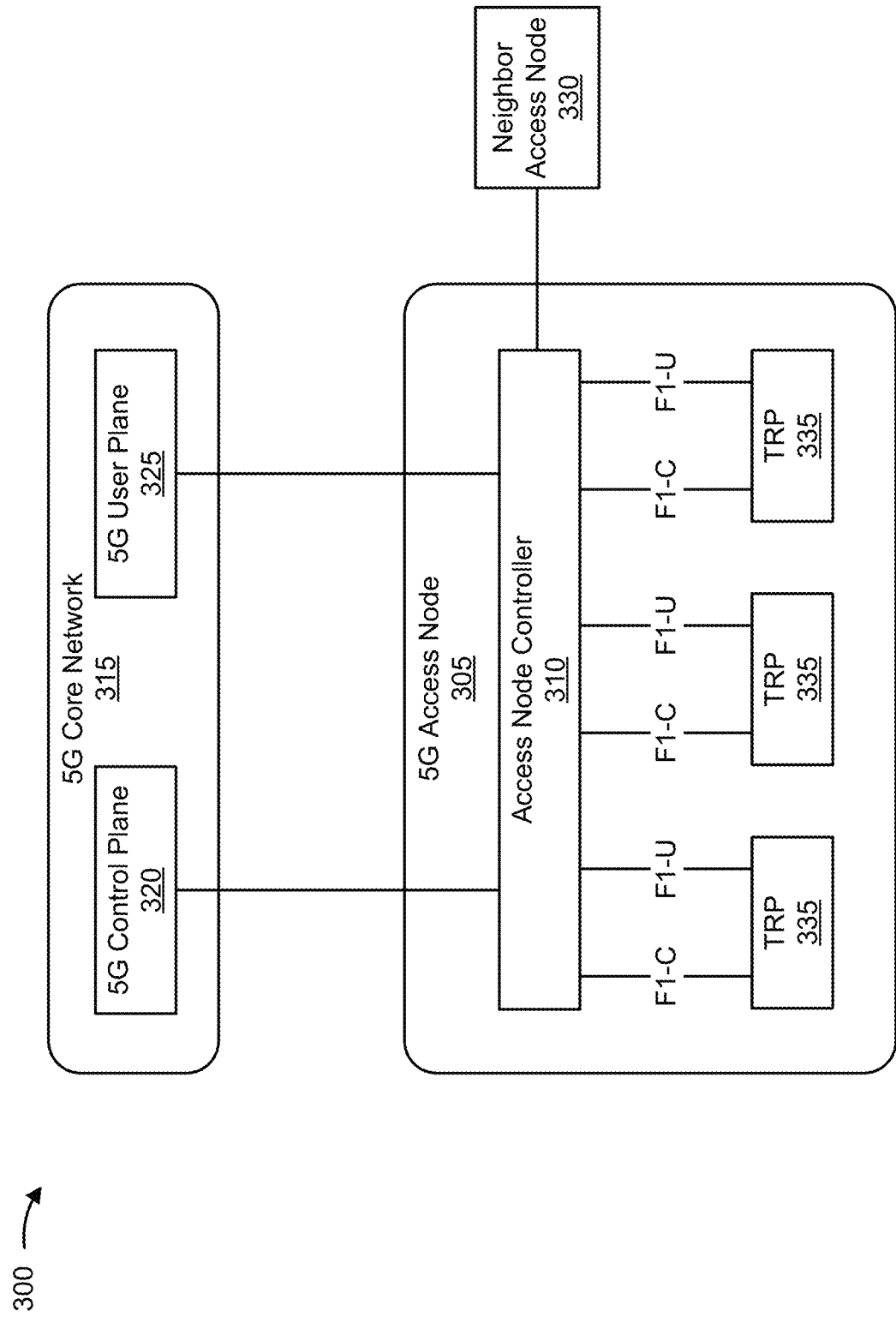
FIG. 3 is a diagram illustrating an example of a logical architecture of a distributed radio access network (RAN), in accordance with the present disclosure.

FIG. 3 illustrates an example logical architecture of a distributed RAN 300, in accordance with the present disclosure.

A 5G access node 305 may include an access node controller 310. The access node controller 310 may be a central unit (CU) of the distributed RAN 300. In some aspects, a backhaul interface to a 5G core network 315 may terminate at the access node controller 310. The 5G core network 315 may include a 5G control plane component 320 and a 5G user plane component 325 (e.g., a 5G gateway), and the backhaul interface for one or both of the 5G control plane and the 5G user plane may terminate at the access node controller 310. Additionally, or alternatively, a backhaul interface to one or more neighbor access nodes 330 (e.g., another 5G access node 305 and/or an LTE access node) may terminate at the access node controller 310.

The access node controller 310 may include and/or may communicate with one or more TRPs 335 (e.g., via an F1 Control (F1-C) interface and/or an F1 User (F1-U) interface). A TRP 335 may be a distributed unit (DU) of the distributed RAN 300. In some aspects, a network device, such as a TRP 335, may correspond to a base station 110 described above in connection with FIG. 1. For example, different TRPs 335 may be included in different base stations 110. Additionally, or alternatively, multiple network devices, such as multiple TRPs 335, may be included in a single base station 110. In some aspects, a base station 110 may include a CU (e.g., access node controller 310) and/or one or more DUs (e.g., one or more TRPs 335). In some cases, a TRP 335 may be referred to as a cell, a panel, an antenna array, or an array.

A TRP 335 may be connected to a single access node controller 310 or to multiple access node controllers 310. In some aspects, a dynamic configuration of split logical functions may be present within the architecture of distributed RAN 300. For example, a packet data convergence protocol (PDCP) layer, a radio link control (RLC) layer, and/or a medium access control (MAC) layer may be configured to terminate at the access node controller 310 or at a TRP 335.

In some aspects, multiple TRPs 335 may transmit communications (e.g., the same communication or different communications) in the same transmission time interval (TTI) (e.g., a slot, a mini-slot, a subframe, or a symbol) or different TTIs using different quasi-co-location (QCL) relationships (e.g., different spatial parameters, different transmission configuration indicator (TCI) states, different precoding parameters, and/or different beamforming parameters). In some aspects, a TCI state may be used to indicate one or more QCL relationships. A TRP 335 may be configured to individually (e.g., using dynamic selection) or jointly (e.g., using joint transmission with one or more other TRPs 335) serve traffic to a UE 120.

As indicated above, FIG. 3 is provided as an example. Other examples may differ from what was described with regard to FIG. 3.

Figure 4:
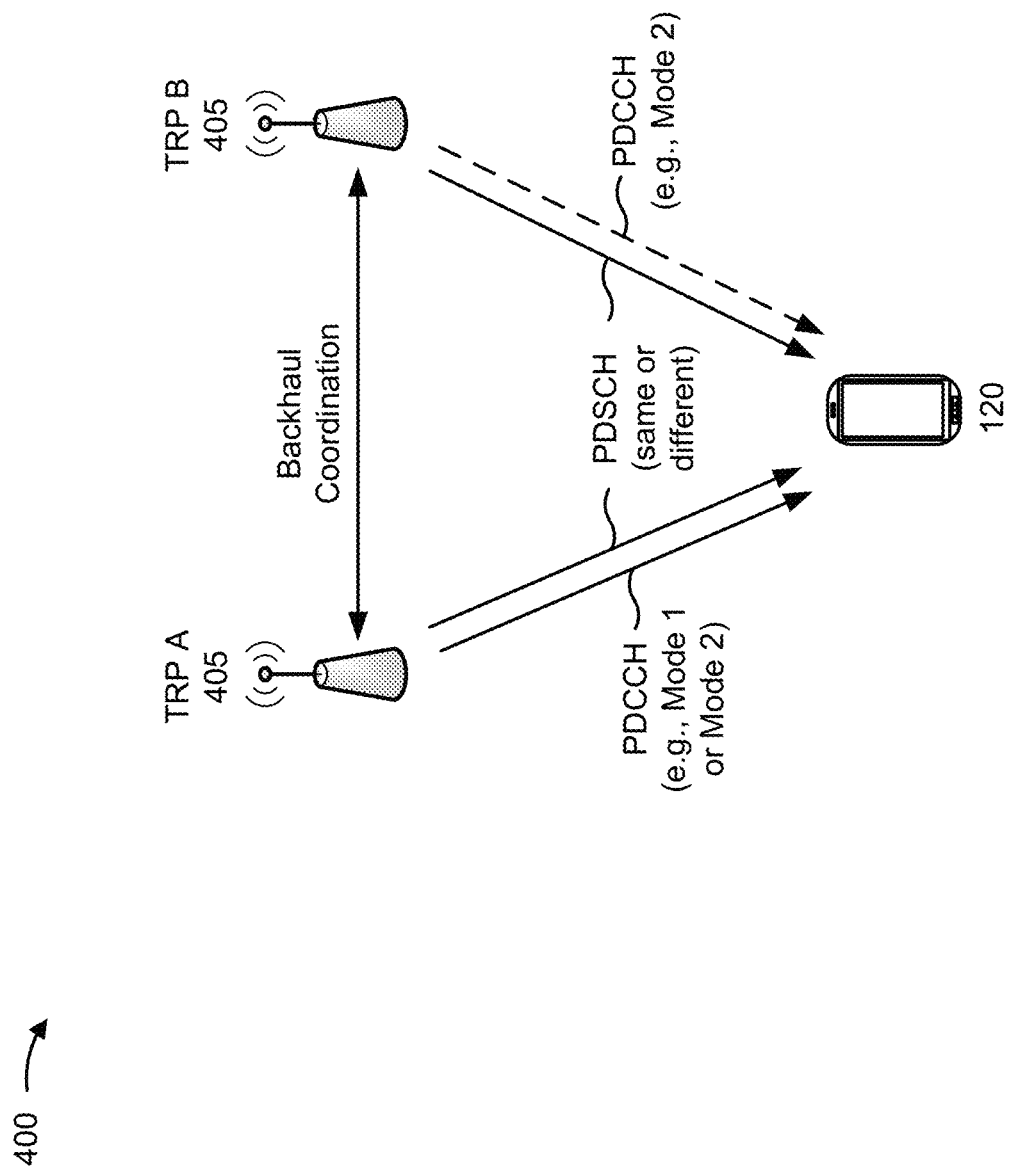
FIG. 4 is a diagram illustrating an example multiple transmit receive point (TRP) (multi-TRP or mTRP) communication, in accordance with the present disclosure.

FIG. 4 is a diagram illustrating an example 400 of multi-TRP or mTRP communication (sometimes referred to as multi-panel communication), in accordance with the present disclosure. As shown in FIG. 4, network devices, such as multiple TRPs 405, may communicate with the same UE 120. A TRP 405 (which, in an mTRP deployment, may be termed an "mTRP" or "mTRP 405") may correspond to a TRP 335 described above in connection with FIG. 3.

The multiple TRPs 405 (shown as TRP A and TRP B) may communicate with the same UE 120 in a coordinated manner (e.g., using coordinated multipoint transmissions) to improve reliability and/or increase throughput. The TRPs 405 may coordinate such communications via an interface between the TRPs 405 (e.g., a backhaul interface and/or an access node controller 310). The interface may have a smaller delay and/or higher capacity when the TRPs 405 are co-located at the same base station 110 (e.g., when the TRPs 405 are different antenna arrays or panels of the same base station 110), and may have a larger delay and/or lower capacity (as compared to co-location) when the TRPs 405 are located at different base stations 110. The different TRPs 405 may communicate with the UE 120 using different QCL relationships (e.g., different TCI states), different demodulation reference signal (DMRS) ports, and/or different layers (e.g., of a multi-layer communication).

In a first multi-TRP transmission mode (e.g., Mode 1), a single physical downlink control channel (PDCCH) may be used to convey a single downlink control information (s-DCI) to schedule downlink data communications for a single physical downlink shared channel (PDSCH). In this case, multiple TRPs 405 (e.g., TRP A and TRP B) may transmit communications to the UE 120 on the same PDSCH. For example, a communication may be transmitted using a single codeword with different spatial layers for different TRPs 405 (e.g., where one codeword maps to a first set of layers transmitted by a first TRP 405 and maps to a second set of layers transmitted by a second TRP 405). As another example, a communication may be transmitted using multiple codewords, where different codewords are transmitted by different TRPs 405 (e.g., using different sets of layers). In either case, different TRPs 405 may use different QCL relationships (e.g., different TCI states) for different DMRS ports corresponding to different layers. For example, a first TRP 405 may use a first QCL relationship or a first TCI state for a first set of DMRS ports corresponding to a first set of layers, and a second TRP 405 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple PDCCHs may be used to convey multiple DCI (m-DCI) to schedule downlink data communications for multiple corresponding PDSCHs (e.g., one PDCCH for each PDSCH). In this case, a first PDCCH may schedule a first codeword to be transmitted by a first TRP 405, and a second PDCCH may schedule a second codeword to be transmitted by a second TRP 405. Furthermore, first DCI (e.g., transmitted by the first TRP 405) may schedule a first PDSCH communication associated with a first set of DMRS ports with a first QCL relationship (e.g., indicated by a first TCI state) for the first TRP 405, and second DCI (e.g., transmitted by the second TRP 405) may schedule a second PDSCH communication associated with a second set of DMRS ports with a second QCL relationship (e.g., indicated by a second TCI state) for the second TRP 405. In this case, DCI (e.g., having DCI format 1_0 or DCI format 1_1) may indicate a corresponding TCI state for a TRP 405 corresponding to the DCI. The TCI field of a DCI indicates the corresponding TCI state (e.g., the TCI field of the first DCI indicates the first TCI state and the TCI field of the second DCI indicates the second TCI state).

Under a unified TCI framework, different types of common TCI states may be indicated. For example, a type-1 TCI may be a joint downlink (DL)/uplink (UL) (DL/UL) common TCI state to indicate a common beam for at least one DL channel or reference signal (RS) and at least one UL channel or RS. A type-2 TCI may be a separate DL (e.g., separate from UL) common TCI state to indicate a common beam for more than one DL channel or RS. A type-3 TCI may be a separate UL common TCI state to indicate a common beam for more than one UL channel or RS. A type-4 TCI may be a separate DL single channel or RS TCI state to indicate a beam for a single DL channel or RS. A type-5 TCI may be a separate UL single channel or RS TCI state to indicate a beam for a single UL channel or RS. A type-6 TCI may include UL spatial relation information (e.g., such as a sounding reference signal (SRS) resource indicator (SRI)) to indicate a beam for a single UL channel or RS. Example RSs that may be configured using a TCI state, such as under the unified TCI framework, may include a synchronization signal block (SSB), a tracking reference signal (TRS) and an associated channel state information (CSI) reference signal (RS) (CSI-RS) for tracking, a CSI-RS for beam management, a CSI-RS for CQI management, or a demodulation reference signal (DM-RS) associated with non-UE-dedicated reception on a PDSCH and a set or subset of control resource sets (CORESETs), among other examples.

As indicated above, FIG. 4 is provided as an example. Other examples may differ from what is described with respect to FIG. 4.

Figure 5:
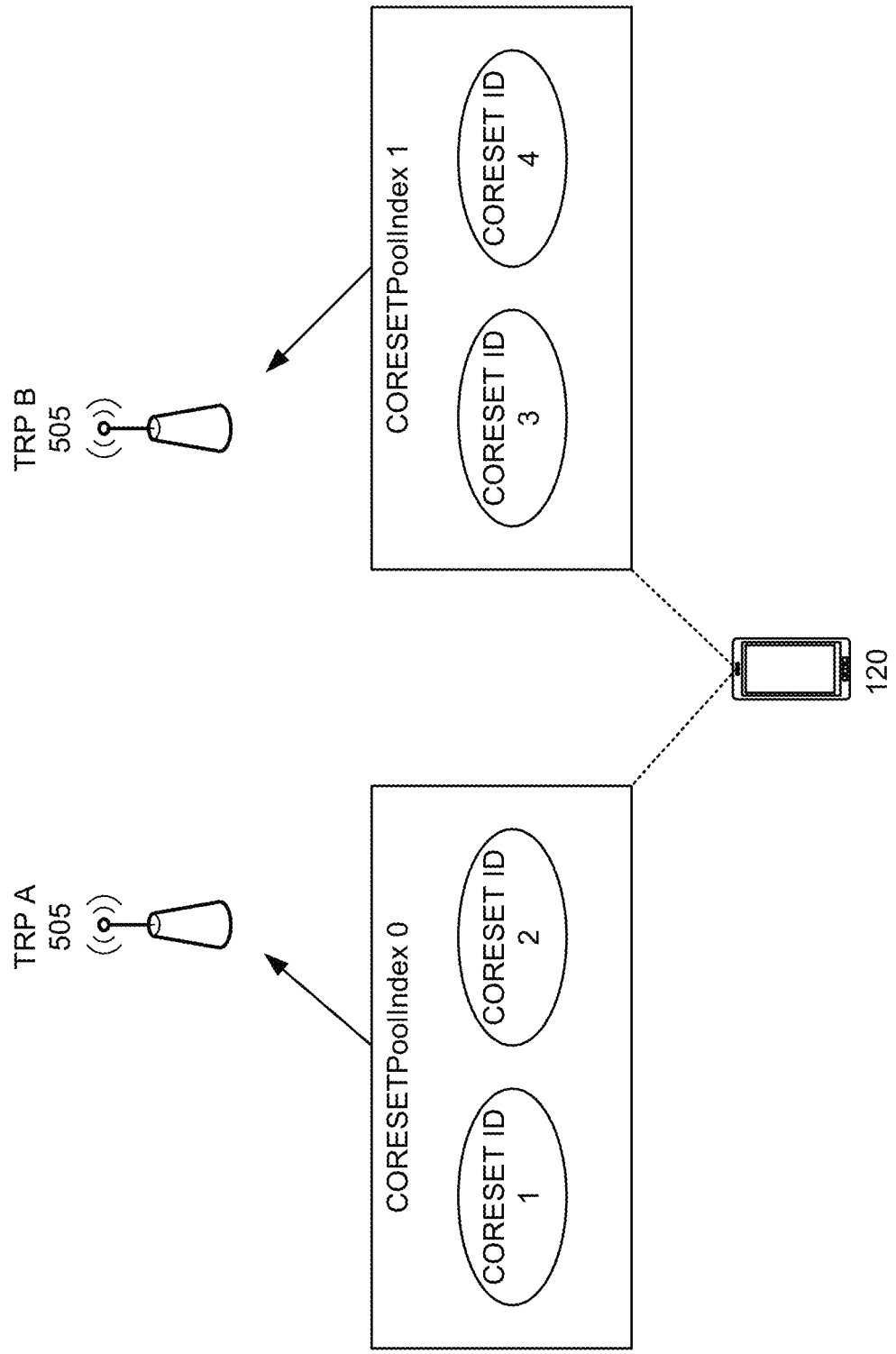
FIG. 5 is a diagram illustrating an example of TRP differentiation at a UE based at least in part on a control resource set (CORESET) pool index, in accordance with the present disclosure.

FIG. 5 is a diagram illustrating an example of TRP differentiation at a UE based at least in part on a CORESET pool index, in accordance with the present disclosure. In some aspects, a CORESET pool index (or CORESET-PoolIndex) value may be used by a UE (a UE 120) to identify a TRP associated with an uplink grant received on a PDCCH.

"CORESET" may refer to a control region that is structured to support an efficient use of resources, such as by flexible configuration or reconfiguration of resources for one or more PDCCHs associated with a UE. In some aspects, a CORESET may occupy the first symbol of an orthogonal frequency division multiplexing (OFDM) slot, the first two symbols of an OFDM slot, or the first three symbols of an OFDM slot. Thus, a CORESET may include multiple resource blocks (RBs) in the frequency domain, and either one, two, or three symbols in the time domain. In 5G, a quantity of resources included in a CORESET may be flexibly configured, such as by using radio resource control (RRC) signaling to indicate a frequency domain region (for example, a quantity of resource blocks) or a time domain region (for example, a quantity of symbols) for the CORESET.

As illustrated in FIG. 5, a UE 120 may be configured with multiple CORESETs in a given serving cell. Each CORESET configured for the UE 120 may be associated with a CORESET identifier (CORESET ID). For example, a first CORESET configured for the UE 120 may be associated with CORESET ID 1, a second CORESET configured for the UE 120 may be associated with CORESET ID 2, a third CORESET configured for the UE 120 may be associated with CORESET ID 3, and a fourth CORESET configured for the UE 120 may be associated with CORESET ID 4.

As further illustrated in FIG. 5, two or more (for example, up to five) CORESETs may be grouped into a CORESET pool. Each CORESET pool may be associated with a CORESET pool index. As an example, CORESET ID 1 and CORESET ID 2 may be grouped into CORESET pool index 0, and CORESET ID 3 and CORESET ID 4 may be grouped into CORESET pool index 1. In a multi-TRP configuration, each CORESET pool index value may be associated with a particular TRP 505. As an example, and as illustrated in FIG. 5, a first TRP 505 (TRP A) may be associated with CORESET pool index 0 and a second TRP 505 (TRP B) may be associated with CORESET pool index 1. The UE 120 may be configured by a higher layer parameter, such as PDCCH-Config, with information identifying an association between a TRP and a CORESET pool index value assigned to the TRP. Accordingly, the UE may identify the TRP that transmitted a DCI uplink grant by determining the CORESET ID of the CORESET in which the PDCCH carrying the DCI uplink grant was transmitted, determining the CORESET pool index value associated with the CORESET pool in which the CORESET ID is included, and identifying the TRP associated with the CORESET pool index value.

As indicated above, FIG. 5 is provided as an example. Other examples may differ from what is described with respect to FIG. 5.

Figure 6:
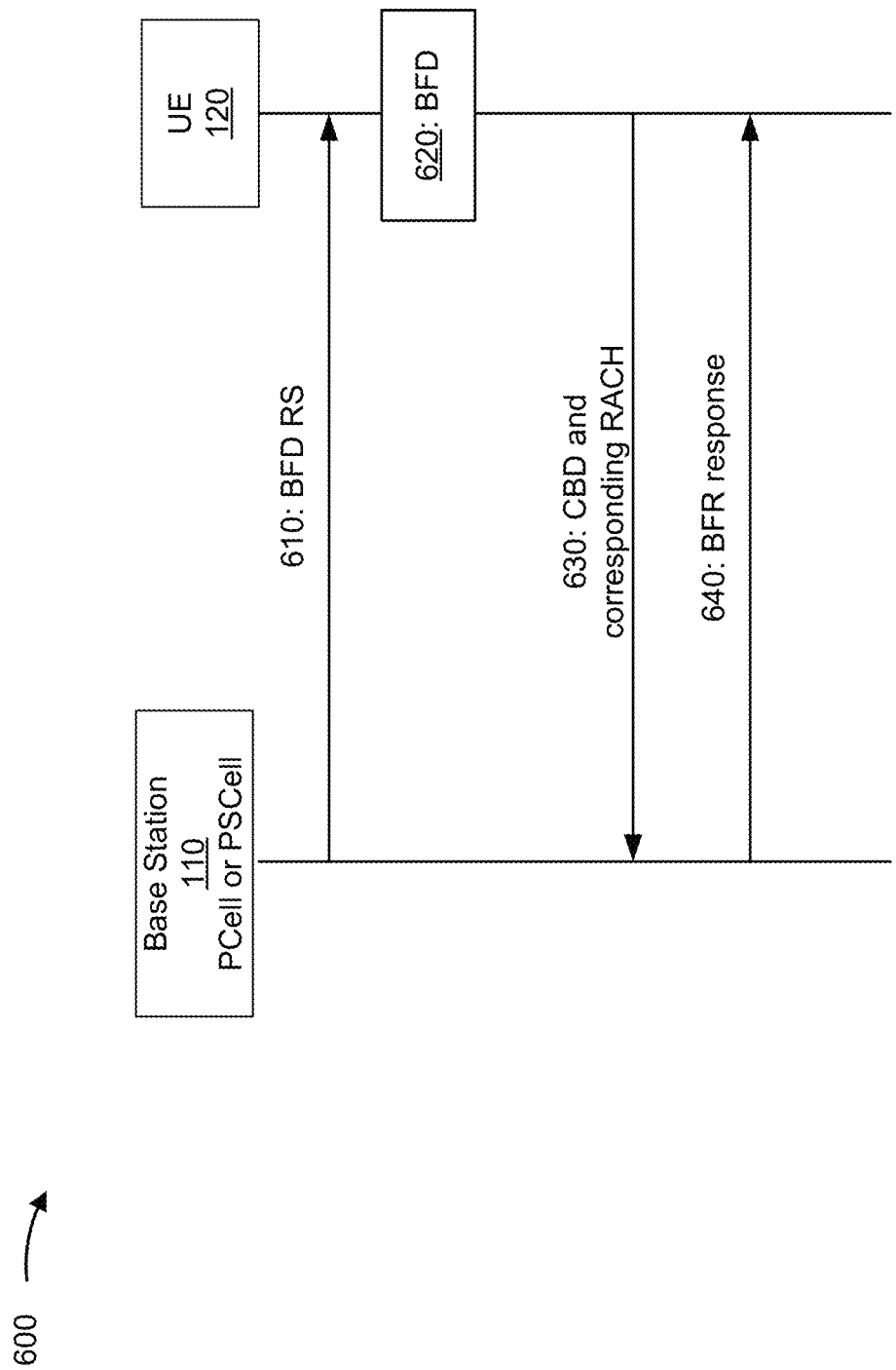
FIG. 6 is a diagram illustrating an example of beam failure recovery, in accordance with the present disclosure.

FIG. 6 is a diagram illustrating an example 600 of beam failure recovery, in accordance with the present disclosure. As shown in example 600, the beam failure recovery may include a UE 120 in communication with a base station 110 (e.g., a TRP of a base station 110) of a primary cell (PCell or Pcell) or a primary secondary cell (PSCell or PScell).

As further shown in FIG. 6, and by reference number 610, UE 120 may attempt to receive a beam failure detection (BFD) reference signal (RS) (BFD-RS). For example, UE 120 may be configured (e.g., via radio resource control (RRC) signaling) with a set of periodic CSI-RS resources for beam failure detection. Additionally, or alternatively, when resources are not configured for beam failure detection, UE 120 may monitor for reference signal sets indicated by an active TCI state of one or more CORESETs that are being monitored by UE 120. In this case, for an active TCI state of a CORESET, two reference signal indices may be configured and UE 120 may monitor for a reference signal corresponding to a reference signal index, of the two configured reference signal indices, associated with QCL type-D.

As further shown in FIG. 6, and by reference number 620, UE 120 may detect a beam failure. For example, UE 120 may monitor, at a physical (PHY) layer, a radio link quality associated with a reference signal and determine that the radio link quality does not satisfy a quality level threshold (Q_out). In this case, based at least in part on the radio link quality not satisfying the threshold (e.g., for all reference signals of a beam failure detection resource set), UE 120 may provide an indication to a higher layer (e.g., a radio link control (RLC) layer or a medium access control (MAC) layer) to trigger beam recovery.

As further shown in FIG. 6, and by reference number 630, UE 120 may perform candidate beam detection (CBD) (which may be referred to as "new beam identification (NBI)") and transmit a random access channel (RACH) communication. For example, at the higher layer to which UE 120 provided the indication of the beam failure, UE 120 may generate a list of reference signal indices and reference signal received powers (RSRPs) for reference signals that have RSRP values greater than a threshold level (Q_in). UE 120 may initiate a contention-free random access procedure (RACH procedure) using a random access resource associated with a selected reference signal index (q_new) with an RSRP above the threshold level (e.g., selected from the list).

As further shown in FIG. 6, and by reference number 640, UE 120 may monitor for a beam failure response (BFR). For example, UE 120 may monitor for a PDCCH in a search space set (e.g., provided by a parameter recoverySearchSpaceID) for detection of a DCI with a particular DCI format (e.g., a DCI format with a cyclic redundancy check (CRC) scrambled by a cell-specific radio network temporary identifier (RNTI) (C-RNTI) or a modulation and coding scheme (MCS)-specific C-RNTI (MCS-C-RNTI)). The UE 120 may monitor for the PDCCH starting a threshold quantity of slots (e.g., n+4) after transmitting the RACH (e.g., in slot n). In this case, the BFR may be a random access response (RAR) message. When UE 120 receives the PDCCH within a threshold time window, UE 120 may consider a beam failure recovery process to be complete.

In some examples, after transmitting the RACH, UE 120 may use a particular set of QCL assumptions. For example, for PDCCH monitoring in a search space (SS) set (SSS) indicated by a recoverySearchSpaceID parameter and/or for a corresponding PDSCH reception, UE 120 may use the same QCL parameters as are associated with the reference signal index q_new. UE 120 may use the QCL parameters until UE 120 receives an activation for another TCI state or receives a TCI state list adjustment parameter (e.g., TCI-StatesPDCCH-ToAddList or TCI-StatesPDCCH-ToReleaseList), which may indicate and/or alter QCL parameters for UE 120. In some examples, UE 120 may perform a beam reset a particular quantity of symbols after a last symbol of a first PDCCH reception in the SSS. For example, 28 symbols after the last symbol of the first PDCCH reception where UE 120 detects a DCI with the particular DCI format, UE 120 may reset a beam, as described herein.

As indicated above, FIG. 6 is provided as an example. Other examples may differ from what is described with respect to FIG. 6.

Figure 7:
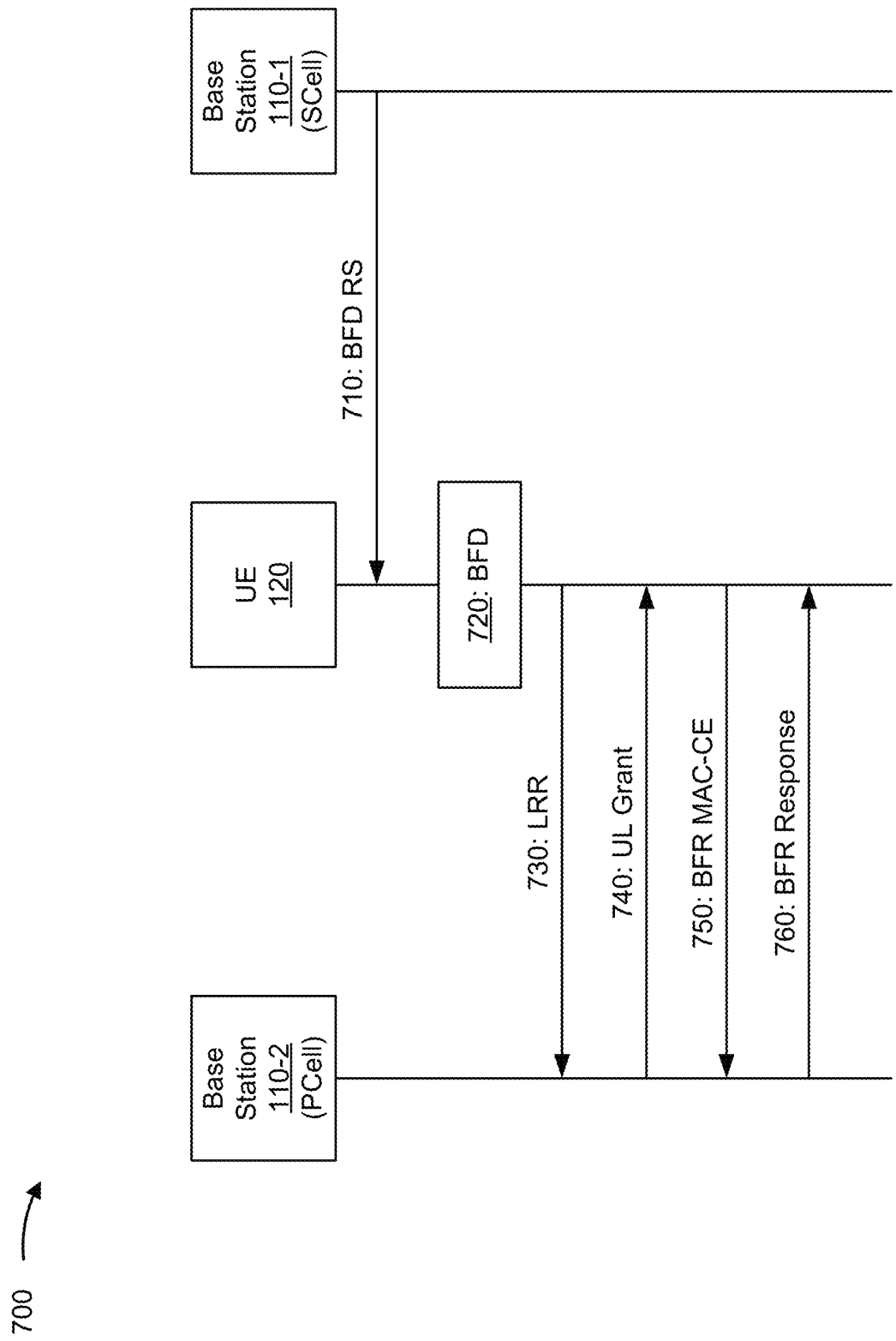
FIG. 7 is a diagram illustrating an example of beam failure recovery, in accordance with the present disclosure.

FIG. 7 is a diagram illustrating an example 700 of beam failure recovery, in accordance with the present disclosure. As shown in example 700, the beam failure recovery may include a UE 120 in communication with a base station 110-1 of a secondary cell (SCell or Scell) (e.g., a first network device or TRP) and a base station 110-2 of a PCell (e.g., a second network device or TRP). In another example, base station 110-1 may provide an SCell and base station 110-2 may provide a PSCell or a physical uplink control channel (PUCCH)-SCell, among other examples. In some examples, base station 110-1 and base station 110-2 may be multiple network devices or TRPs of a single base station 110.

As further shown in FIG. 7, and by reference numbers 710 and 720, UE 120 may receive a BFD-RS from base station 110-1 and may detect a beam failure. For example, UE 120 may determine that a link quality metric associated with the BFD-RS does not satisfy a threshold and may determine that a beam failure has occurred.

As further shown in FIG. 7, and by reference number 730, UE 120 may transmit a link recovery request (LRR) to base station 110-2 (e.g., which may be associated with a cell with a PUCCH BFR resource configured). The LRR may use a PUCCH format 0 or a PUCCH format 1 to convey information associated with initiating beam failure recovery.

As further shown in FIG. 7, and by reference number 740, UE 120 may receive a response to the LRR. For example, UE 120 may receive an uplink grant with a C-RNTI or MCS-C-RNTI as a response to the LRR. In this case, the uplink grant may schedule a physical uplink shared channel (PUSCH) in which UE 120 may transmit a BFR medium access control (MAC) control element (CE) (MAC-CE). In another example, in which UE 120 is already configured with an uplink grant, UE 120 may forgo transmission of the LRR and reception of the uplink grant, and proceed with transmitting the BFR MAC-CE, as shown by reference number 750. UE 120 may include, in the BFR MAC-CE, information identifying a best new beam for recovery of a failed SCell. For example, UE 120 may include an SCell index and information identifying one or more new candidate beams. UE 120 may transmit the BFR MAC-CE on the failed SCell or on another cell (e.g., the PCell or a PSCell, among other examples).

As further shown in FIG. 7, and by reference number 760, UE 120 may receive a BFR response (BFRR). For example, UE 120 may receive an uplink grant, in a PDCCH, to schedule a transmission with the same hybrid automatic repeat request (HARQ) process identifier as the BFR MAC-CE. In this case, the BFR MAC-CE included information identifying a new beam, then, after 28 symbols from the end of the BFR response, UE 120 may reset all CORESET beams on the failed SCell to the new beam. Additionally, or alternatively, if the failed SCell is a PUCCH-SCell, and if a PUCCH-spatialRelationInfo parameter is configured and the LRR is not transmitted on the failed Scell, UE 120 may reset PUCCH beams on the failed Scell to the new beam.

As indicated above, FIG. 7 is provided as an example. Other examples may differ from what is described with respect to FIG. 7.

As described above, a UE may use a beam failure recovery procedure to reset and/or recover a beam after a beam failure is detected using a beam failure detection reference signal. In some communications systems, each cell, which the UE accesses, may have groups of beams corresponding to TRPs (e.g., in a multi-TRP deployment) associated with the cell. In other words, a UE may access a cell that has a first group of beams associated with a first TRP and a second group of beams associated with a second TRP. Beams and TCI states associated with each TRP may be associated with different CORESET pool identifiers and a UE may identify a TRP association based at least in part on a CORESET pool identifier. The UE may be configured with a beam failure detection reference signal for each beam group and associated TRP.

The UE may trigger a per-TRP BFR procedure for a particular TRP when a BFD-RS associated with the particular TRP indicates a beam failure condition. In other words, the UE may detect, using a BFD-RS associated with a first TRP in a cell, a beam failure associated with a beam of a first beam group corresponding to the first TRP in the cell. In this case, a beam failure may not be detected for other beams in the first beam group or for beams in a second beam group corresponding to a second TRP in the cell. Accordingly, the UE may not trigger a BFR procedure for the other beams and/or for the second TRP. As the other beams in the first beam group have not failed, the UE may send a BFR request (BFRQ) via a PUCCH or a PUSCH associated with one of the other beams in the first beam group. In this case, the UE may transmit a scheduling request to a base station (e.g., associated with the TRPs in the cell) to obtain an uplink grant. Up to two PUCCH-SR resources may be configured per TRP BFR for the UE. The UE may use the uplink grant to transmit a BFR MAC-CE to identify additional information regarding the beam failure, such as a TRP identifier for the first TRP, a component carrier or bandwidth part identifier for the failed beam, or an identifier of a new beam to use as the reset beam, among other examples.

However, although the UE can transmit a BFR MAC-CE to identify additional information regarding the beam failure, the UE lacks association information to generate some of the additional information. For example, the UE may lack information to identify an association between a channel or TCI state and a failed TRP. As a result, the UE may be unable to identify, to a base station, which TRP is the failed TRP, thereby preventing a per-TRP BFR. Further, different TRPs may have different subcarrier spacings (SCSs), which may result in ambiguity regarding a timeline of when to apply a reset beam in a per-TRP BFR. Additionally, in the unified TCI framework, a single TCI state can apply to a plurality of channels or reference signals of both an uplink and a downlink, which may result in ambiguity regarding an identification of a channel to which to apply a reset beam. These ambiguities can result in a loss of synchronization between a UE and a base station (and associated network devices or TRPs thereof), thereby resulting in dropped communications or poor network performance. Other issues may also exist with other aspects of a beam failure recovery procedure that may result in poor network performance, as described in more detail herein.

Some aspects described herein enable per-TRP BFR. For example, a UE may use an RRC configuration or an order of TCI states in a TCI codepoint to identify an association between a TRP and a TCI state and/or channel. In this case, based at least in part on identifying the association between the TRP and the TCI state and/or channel, the UE can identify a failed TRP based at least in part on detecting a beam failure of a beam associated with a particular TCI state. Additionally, or alternatively, the UE may determine an SCS for a beam reset timeline, in accordance with a defined rule, such as based at least in part on a TRP or component carrier that is used to send a BFRQ, that is used to receive a BFRR, on which to apply a reset beam, or in which a beam failure occurs, among other examples. Additionally, or alternatively, the UE may apply a reset beam to one or more channels in accordance with a set of defined decision criteria. In this way, the UE and a base station (and associated TRPs or other network devices) may perform a per-TRP BFR without ambiguities resulting in dropped communications or poor network performance.

Figure 8:
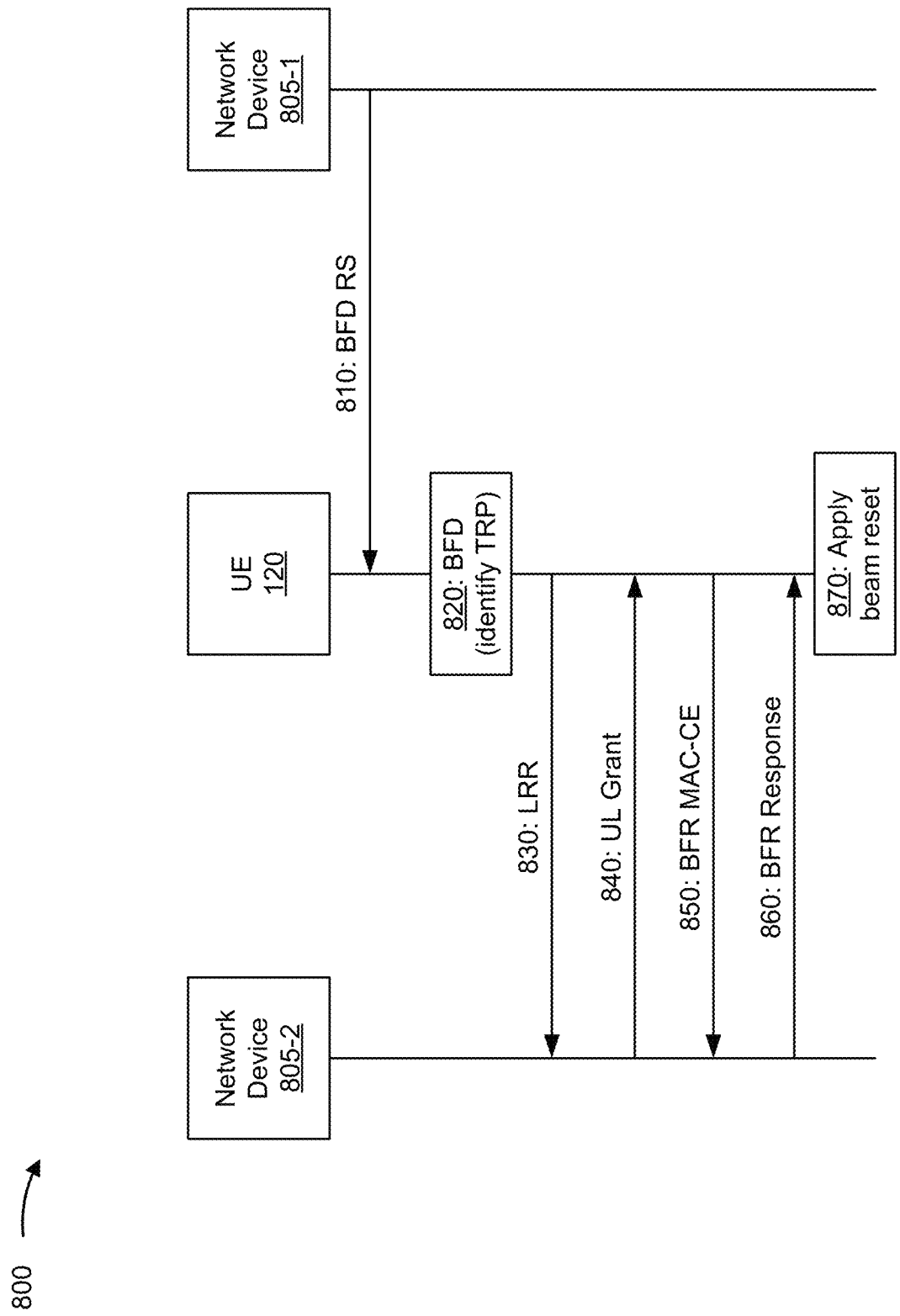
FIG. 8 is a diagram illustrating an example associated with beam reset in an mTRP deployment, in accordance with the present disclosure.

FIG. 8 is a diagram illustrating an example 800 associated with beam reset in a multi-TRP deployment, in accordance with the present disclosure. As shown in FIG. 8, example 800 includes communication between a set of network devices 805-1 and 805-2 (e.g., in a multi-TRP deployment) and a UE 120. In some aspects, each network device 805 may correspond to a base station 110, a TRP 335, a TRP 405, or a TRP 505, among other examples. In some aspects, network devices 805 are TRPs of a single base station 110. In some aspects, network devices 805 are TRPs of different base stations 110.

As further shown in FIG. 8, and by reference numbers 810 and 820, UE 120 may receive a BFD-RS from network device 805-1 and may detect a beam failure. For example, UE 120 may determine that a link quality metric associated with the BFD-RS (e.g., a reference signal, such as a pathloss (PL) reference signal (PLRS) or a radio link monitoring (RLM) reference signal (RLM-RS), among other examples that may serve as a BFD-RS) does not satisfy a threshold level and may determine that a beam failure has occurred. In this case, UE 120 may determine that a beam on which the BFD-RS is transmitted is a failed beam. In some aspects, the BFD-RS may be associated with a TCI state from which UE

120 may identify a failed TRP (e.g., network device 805-1). For example, UE 120 may determine a TCI state of the BFD-RS and/or the BFD-RS set that includes the BFD-RS, and may derive an identifier of the failed TRP based at least in part on an association between TCI states and TRPs, as described herein. In this case, the BFD-RS can share the same TCI state as a UE-dedicated PDSCH or PDCCH.

In some aspects, UE 120 may identify an associated TRP of a TCI state to enable reset of the failed beam of the failed TRP (e.g., network device 805-1) without resetting other beams of the failed TRP and/or other beams of another TRP (e.g., network device 805-2). For example, when UE 120 receives m-DCI, UE 120 may use a CORESET pool identifier field in a TCI state configuration of the m-DCI, which identifies a TRP associated with a TCI state. In this way, UE 120 may identify an association between a TCI state (and a corresponding failed beam with the TCI state) and a failed TRP. In some aspects, an RRC configuration of a BFD-RS set, including the BFD-RS, may include information identifying the association between the BFD-RS set and the TRP to which the BFD-RS set applies.

Additionally, or alternatively, UE 120 may identify an associated TRP of a TCI state based at least in part on a TCI codepoint. For example, when UE 120 receives s-DCI, the s-DCI may include a TCI codepoint that identifies a pair of TCI states corresponding to a pair of TRPs. In this case, UE 120 may associate each TCI state with a corresponding TRP based at least in part on an order of the TCI states and an order of the TRPs. In other words, a sequentially first TCI state in the TCI codepoint is associated to a sequentially first indexed TRP (e.g., a TRP with a lower value index) and a sequentially second TCI state in the TCI codepoint is associated to a sequentially second TRP (e.g., a TRP with a higher value index). In this case, UE 120 may receive further signaling from a network device 805 identifying a BFD-RS set for each TRP and, based at least in part on which BFD-RS set includes the BFD-RS from which the beam failure is detected, UE 120 may determine which TRP is the failed TRP and which TCI state and associated channel or beam are to be reset. For example, when UE 120 determines that a first TRP (e.g., network device 805-1) fails, UE 120 may determine to reset a corresponding first TCI state with a reset beam.

In some aspects, UE 120 may associate a CORESET from a TRP to a BFD-RS set. For example, UE 120 may use an implicit BFD-RS set configuration (e.g., in the m-DCI case) by identifying a BFD-RS in a BFD-RS set that has the same CORESET pool identifier as a TRP. Additionally, or alternatively, UE 120 may receive explicit BFD-RS configuration signaling (e.g., RRC signaling or MAC-CE signaling in the m-DCI case or in the s-DCI case) that indicates an association between TCI states and TRP identifiers. In this case, a reference signal, which is selected as a BFD-RS based at least in part on a TCI state of the reference signal, is associated with a TRP and a BFD-RS set based at least in part on the indicated association and the TCI state of the reference signal.

As further shown in FIG. 8, and by reference numbers 830 and 840, UE 120 may transmit an LRR to network device 805-2 and may receive a response to the LRR. In another example, UE 120 may communicate with network device 805-1 (e.g., on a different beam than the failed beam). UE 120 may receive an uplink grant as a response to the LRR. In this case, the uplink grant may schedule a PUSCH in which UE 120 may transmit a BFR MAC-CE, shown by reference number 850. In some aspects, UE 120 may include, in the BFR MAC-CE, information identifying a best new beam for recovery of a failed SCell. For example, UE 120 may include an SCell index and information identifying one or more new candidate beams. In this case, UE 120 may identify the failed TRP (e.g., network device 805-1) and/or a component carrier or bandwidth part identifier associated with the failed beam in the MAC CE based at least in part on identifying the association between the TCI state of the failed beam and the failed TRP, as described above.

In some aspects, UE 120 may have a configured association between a TRP on an SPCell and a PUCCH-scheduling request (SR) (PUCCH-SR) resource (and SR configuration) on another SPCell. Alternatively, UE 120 may have a configured association between a TRP on an SCell and a PUCCH-SR resource (and SR configuration) on an SPCell. For example, when UE 120 detects the BFD on a first TRP, UE 120 may use a PUCCH SR, associated with the first TRP, on a second TRP to send a BFRQ. Similarly, when UE 120 detects the BFD on the second TRP, UE 120 may use a PUCCH SR, associated with the second TRP, on the first TRP to send the BFRQ. In some aspects, UE 120 may transmit a UE capability to network devices 805 to indicate support for network devices 805 configuring the aforementioned association. In this case, network devices 805 may configure the aforementioned association for UE 120 and UE 120 may use the aforementioned association to determine on which TRP to transmit the BFRQ. Alternatively, when UE 120 does not support and is not configured with the aforementioned association, UE 120 may select a PUCCH-SR resource and associated TRP on which to transmit the BFRQ based at least in part on a stored UE configuration.

As further shown in FIG. 8, and by reference number 860, UE 120 may receive a BFR response (BFRR). For example, UE 120 may receive an uplink grant, in a PDCCH, to schedule a transmission with the same HARQ process identifier as the BFR MAC-CE. In this case, the BFR MAC-CE included information identifying a new beam, then, after 28 symbols from the end of the BFR response, UE 120 may reset all CORESET beams on the failed SCell to the new beam. In some aspects, UE 120 may determine an SCS for the 28 symbols based at least in part on a configured rule or decision criterion. For example, UE 120 (and network devices 805) may be configured to determine the SCS based at least in part on an SCS (e.g., a smallest SCS or a largest SCS) of a TRP or component carrier on which UE 120 transmits the BFRQ (e.g., network device 805-2 or another network device), a TRP or component carrier on which UE 120 receives the BFRR (e.g., network device 805-2 or another network device), a TRP or component carrier for which to apply the reset beam (e.g., network device 805-1 or another network device), or a TRP or component carrier on which the beam failure occurred (e.g., network device 805-1 or another network device). In this case, based at least in part on UE 120 being statically configured with the configured rule or decision criteria, UE 120 deterministically identifies the SCS (e.g., UE 120 identifies the SCS in the same way that network devices 805 expect UE 120 to identify the SCS), thereby maintaining synchronization with network devices 805.

In one example, UE 120 determines a symbol length of the 28 symbols based at least in part on a smallest SCS of a BFRR component carrier and of reported component carriers in the BFRQ. In another example, UE 120 determines the symbol length of the 28 symbols based at least in part on a largest SCS of a BFRR component carrier and a component carrier associated with one or more failed TRPs. In another example, UE 120 determines the symbol length of the 28 symbols based at least in part on the smallest SCS of a BFRR component carrier and one or more cells with one or more failed TRPs. In another example, UE 120 determines the symbol length of the 28 symbols based at least in part on a smallest SCS configuration of an active DL bandwidth part for PDCCH reception (e.g., for the BFRR) and an active DL bandwidth part of failed BFD-RS sets and/or cells indicated by the BFR MAC-CE. In another example, UE 120 determines the symbol length of the 28 symbols based at least in part on a smallest SCS configuration of an active DL bandwidth part for PDCCH reception and of an active DL bandwidth part of BFD-RS sets and/or cells with beam failures and new beams indicated by the BFR MAC-CE.

As further shown in FIG. 8, and by reference number 870, UE 120 may apply a reset beam. For example, 28 symbols after a last symbol of a PDCCH conveying the BFRR, UE 120 may apply the beam reset. In some aspects, UE 120 may apply the beam reset to a fixed set of channels statically defined for UE 120 (e.g., in a specification or via static signaling). For example, UE 120 may apply a reset beam to a UE-dedicated PDCCH and PDSCH. Additionally, or alternatively, when a joint DL/UL TCI state, of the unified TCI framework, is activated before the beam failure, UE 120 may apply the reset beam to a UE-dedicated PDCCH and PDSCH, to a PUCCH, and to a PUSCH. In some aspects, UE 120 may apply the reset beam based at least in part on an indicated TCI. For example, UE 120 may apply the reset beam to all channels or reference signals sharing an indicated TCI before the beam failure occurred. Additionally, or alternatively, UE 120 may apply the reset beam to a subset of channels or reference signals sharing the indicated TCI, such as only to a PDCCH, only to a PDCCH and a PUCCH, or only to a PDCCH, a PDSCH, a PUSCH, and a PUCCH, among other examples. Additionally, or alternatively, UE 120 may reset power control parameters to a configured set of default values for a subsequent transmission (e.g., associated with the uplink channels and/or reference signals where the reset beam is applied, such as PUSCH, PUCCH, SRS among other examples). The set of default values of the power control parameters may include a channel or reference signal specific value. For example, different default values of a power control parameter after beam reset may be defined for a PUSCH, a PUCCH, or an SRS, among other examples.

In some aspects, UE 120 may apply the reset beam based at least in part on whether a separate DL and UL TCI is activated. For example, UE 120 may apply the reset beam to all or a subset of all channels or reference signals sharing the separate DL TCI (that is activated). Alternatively, UE 120 may apply the reset beam to all or a subset of all channels or reference signals sharing the separate DL TCI (that is activated) and to all or a subset of all channels or reference signals sharing the separate UL TCI (that is activated). In some aspects, UE 120 may use a default value for a power control configuration for UL channel transmission using the reset beam. For example, UE 120 may use the default value for the power control configuration until a reconfiguration procedure is completed with network devices 805, which may include signaled power control parameters.

In some aspects, UE 120 may reset QCL parameters (e.g., for a cell-level BFR with an SPCell) after the 28 symbol period has elapsed. For example, when the BFR is a cell-level BFR for an SPCell, UE 120 may reset QCL parameters to one or more QCL parameters for a selected q_new for all DL channels or reference signals sharing an indicated DL TCI state or joint DL/UL TCI state before the BFRQ. In this case, UE 120 may use the same spatial filter, for all UL channels or reference signals sharing an indicated UL TCI state or joint DL/UL TCI state before the BFRQ, that is used for a last physical random access channel (PRACH) transmission before the BFRQ. In this case, a transmit power may be determined based at least in part on a default set of power control parameters (e.g., a default P0 value, alpha value, or closed loop index value, among other examples).

In some aspects, UE 120 may reset QCL parameters (e.g., for a cell-level BFR with an SCell) after the 28 symbol period has elapsed. For example, when the BFR is a cell-level BFR for an SCell, UE 120 may reset QCL parameters to one or more QCL parameters for a reported q_new for all DL channels or reference signals sharing an indicated DL TCI state or joint DL/UL TCI state before the BFRQ. In this case, UE 120 may use the same spatial domain filter, for all UL channels or reference signals sharing an indicated UL TCI state or joint DL/UL TCI state before the BFRQ, that is used with the reported q_new. In this case, a transmit power may be determined based at least in part on a default set of power control parameters (e.g., a default P0 value, alpha value, or closed loop index value, among other examples). Further, in this case, the SCS of the 28 symbols, as described above, may be based at least in part on a smallest active DL bandwidth part SCS for BFRR reception and active DL bandwidth part for a reported failed SCell.

As indicated above, FIG. 8 is provided as an example. Other examples may differ from what is described with respect to FIG. 8.

Figure 9:
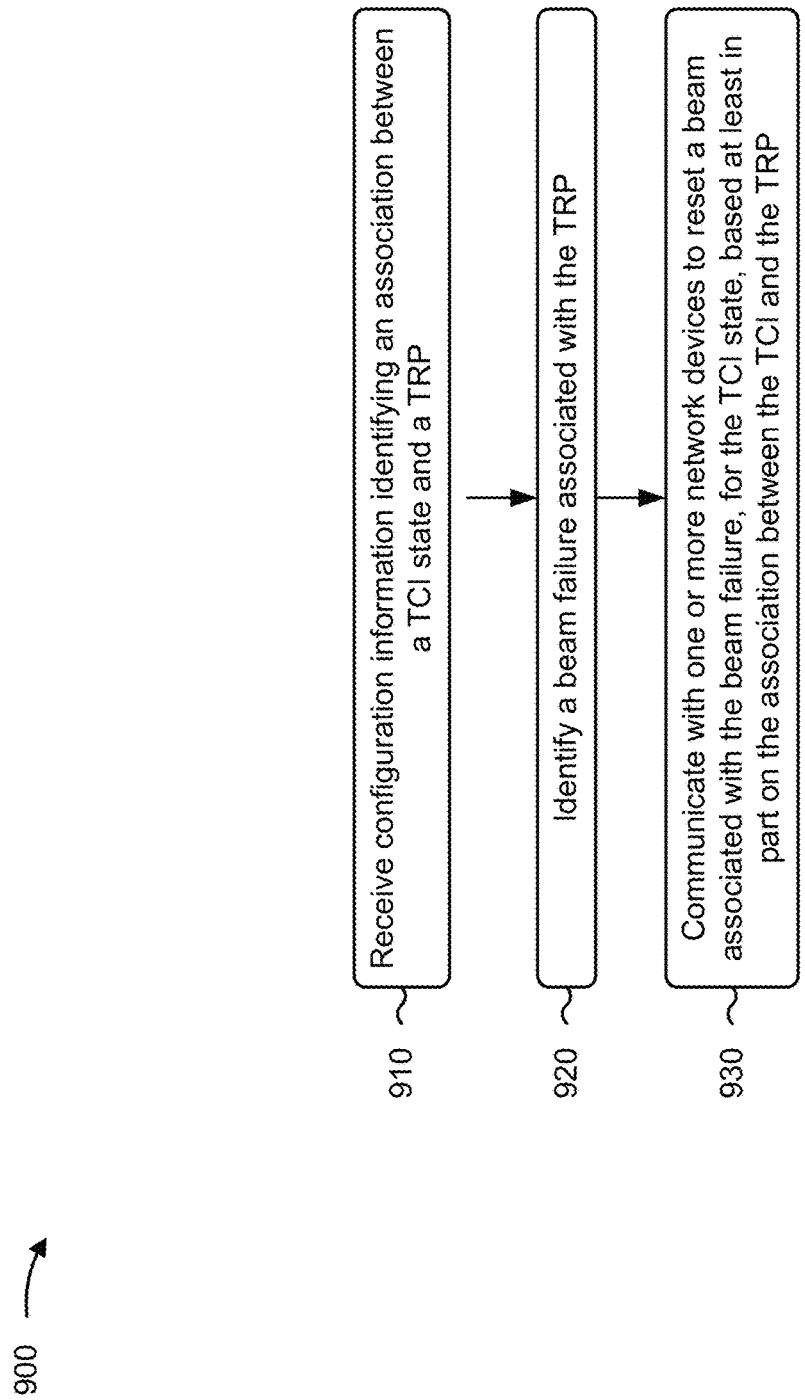
FIGS. 9-10 are diagrams illustrating example processes associated with beam reset in an mTRP deployment, in accordance with the present disclosure.

FIG. 9 is a diagram illustrating an example process 900 performed, for example, by a UE, in accordance with the present disclosure. Example process 900 is an example where the UE (e.g., UE 120) performs operations associated with beam reset in multiple transmit receive point deployments.

As shown in FIG. 9, in some aspects, process 900 may include receiving configuration information identifying an association between a TCI state and a TRP (block 910). For example, the UE (e.g., using communication manager 140 and/or reception component 1102, depicted in FIG. 11) may receive configuration information identifying an association between a TCI state and a TRP, as described above.

As further shown in FIG. 9, in some aspects, process 900 may include identifying a beam failure associated with the TRP (block 920). For example, the UE (e.g., using communication manager 140 and/or identification component 1108, depicted in FIG. 11) may identify a beam failure associated with the TRP, as described above.

As further shown in FIG. 9, in some aspects, process 900 may include communicating with one or more network devices to reset a beam associated with the beam failure, for the TCI state, based at least in part on the association between the TCI and the TRP (block 930). For example, the UE (e.g., using communication manager 140 and/or reception component 1102 or transmission component 1104, depicted in FIG. 11) may communicate with one or more network devices to reset a beam associated with the beam failure, for the TCI state, based at least in part on the association between the TCI and the TRP, as described above.

Process 900 may include additional aspects, such as any single aspect or any combination of aspects described below and/or in connection with one or more other processes described elsewhere herein.

In a first aspect, process 900 includes receiving m-DCI identifying the TCI state, and associating the TCI state with the TRP based at least in part on the configuration information, wherein the configuration information is received via RRC signaling.

In a second aspect, alone or in combination with the first aspect, the configuration information includes a control resource set pool identifier that indicates the TRP associated with the TCI state.

In a third aspect, alone or in combination with one or more of the first and second aspects, process 900 includes receiving a single downlink control information including a TCI codepoint identifying a set of TCI states associated with a set of TRPs, and associating the TCI state with the TRP based at least in part on an order of the set of TCI states and an order of the set of TRPs.

In a fourth aspect, alone or in combination with one or more of the first through third aspects, process 900 includes receiving a beam failure detection reference signal configuration associating a beam failure detection reference signal with the TRP, and identifying the beam failure associated with the TRP comprises identifying the beam failure associated with the TRP based at least in part on the beam failure detection reference signal and an association between the beam failure detection reference signal and the TRP.

In a fifth aspect, alone or in combination with one or more of the first through fourth aspects, communicating with the one or more network devices to reset the beam comprises receiving a BFRR and resetting the beam a threshold period of time after receiving the BFRR.

In a sixth aspect, alone or in combination with one or more of the first through fifth aspects, the threshold period of time is based at least in part on a subcarrier spacing of at least one of a network device or component carrier to which to send a beam failure recovery response, a network device or component carrier from which to receive the BFRR, a network device or component carrier to which to apply a beam reset, or a network device or component carrier for which the beam failure occurred.

In a seventh aspect, alone or in combination with one or more of the first through sixth aspects, a beam reset applies to a fixed set of channels.

In an eighth aspect, alone or in combination with one or more of the first through seventh aspects, a beam reset applies to a set of channels or reference signals associated with the TCI state.

In a ninth aspect, alone or in combination with one or more of the first through eighth aspects, a beam reset applies to a fixed subset of a set of channels or reference signals associated with the TCI state.

In a tenth aspect, alone or in combination with one or more of the first through ninth aspects, a separate downlink TCI and uplink TCI are activated, and a reset beam is applied to one or more channels or reference signals of the downlink TCI only.

In an eleventh aspect, alone or in combination with one or more of the first through tenth aspects, a separate downlink TCI and uplink TCI are activated, and a reset beam is applied to one or more channels or reference signals of the downlink TCI and one or more channels or reference signals of the uplink TCI.

In a twelfth aspect, alone or in combination with one or more of the first through eleventh aspects, the UE is configured to use a statically defined value for a power control configuration for an uplink transmission associated with a reset beam.

In a thirteenth aspect, alone or in combination with one or more of the first through twelfth aspects, communicating with the one or more network devices to reset the beam comprises receiving a secondary primary cell beam failure recovery response, and resetting one or more quasi-co-location parameters associated with the TCI state 28 symbols after receiving the secondary primary cell beam failure recovery response.

In a fourteenth aspect, alone or in combination with one or more of the first through thirteenth aspects, a spatial filter for a physical random access channel transmission is applied to one or more channels or reference signals associated with the TCI state.

In a fifteenth aspect, alone or in combination with one or more of the first through fourteenth aspects, communicating with the one or more network devices to reset the beam comprises receiving a secondary cell beam failure recovery response, and resetting one or more quasi-co-location parameters associated with the TCI state 28 symbols after receiving the secondary cell beam failure recovery response.

In a sixteenth aspect, alone or in combination with one or more of the first through fifteenth aspects, a spatial filter for a physical random access channel transmission is applied to one or more channels or reference signals associated with the TCI state.

In a seventeenth aspect, alone or in combination with one or more of the first through sixteenth aspects, a subcarrier spacing of the 28 symbols is based at least in part on a smallest subcarrier spacing of a first bandwidth part for the reception of the secondary cell beam failure recovery response and a second bandwidth part for reporting a failed secondary cell.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
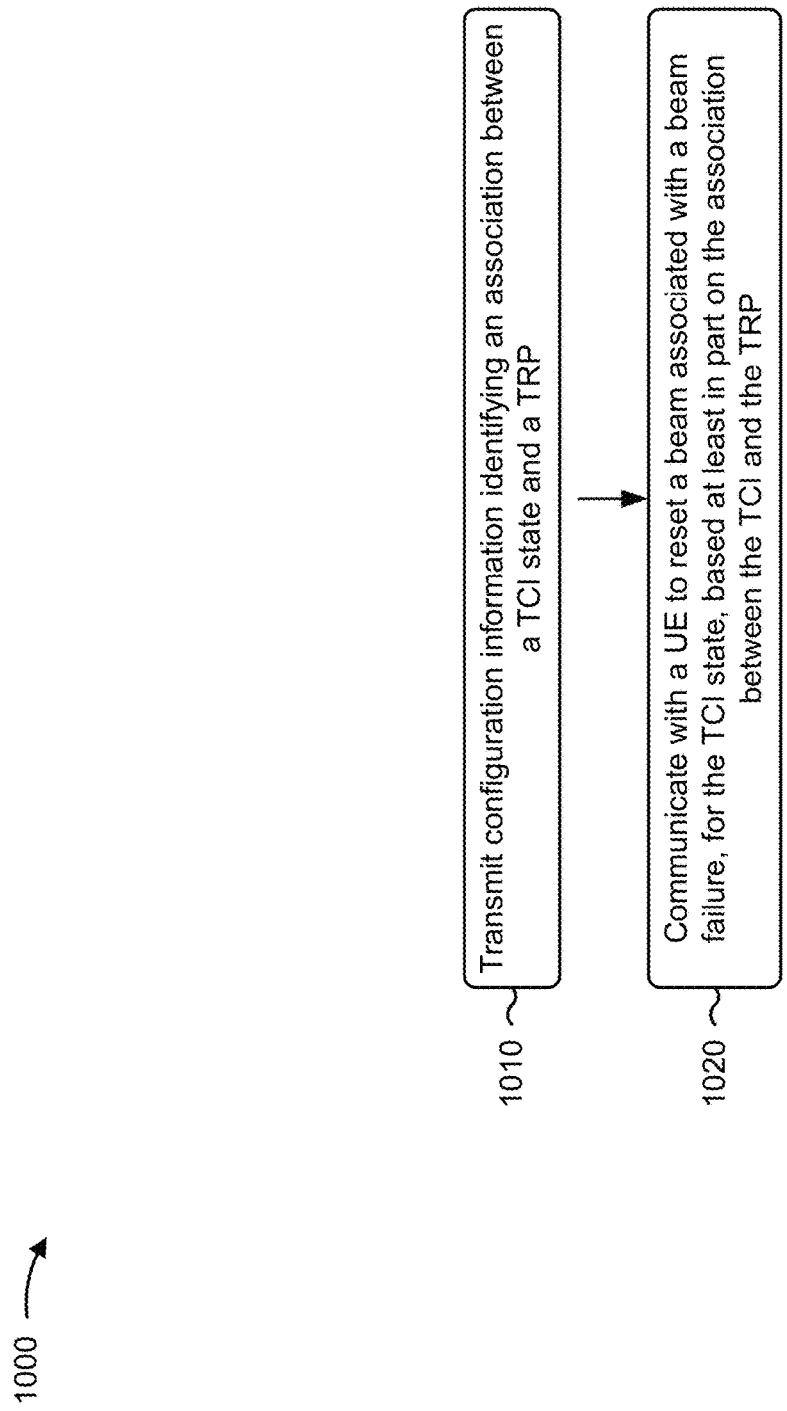

FIG. 10 is a diagram illustrating an example process 1000 performed, for example, by a network device, in accordance with the present disclosure. Example process 1000 is an example where the network device (e.g., base station 110 or network device 805, among other examples) performs operations associated with beam reset in multiple transmit receive point deployments.

As shown in FIG. 10, in some aspects, process 1000 may include transmitting configuration information identifying an association between a TCI state and a TRP (block 1010). For example, the network device (e.g., using communication manager 150 and/or transmission component 1204, depicted in FIG. 12) may transmit configuration information identifying an association between a TCI state and a TRP, as described above.

As further shown in FIG. 10, in some aspects, process 1000 may include communicating with a UE to reset a beam associated with a beam failure, for the TCI state, based at least in part on the association between the TCI and the TRP (block 1020). For example, the network device (e.g., using communication manager 150 and/or reception component 1202 or transmission component 1204, depicted in FIG. 12) may communicate with a UE to reset a beam associated with a beam failure, for the TCI state, based at least in part on the association between the TCI and the TRP, as described above.

Process 1000 may include additional aspects, such as any single aspect or any combination of aspects described below and/or in connection with one or more other processes described elsewhere herein.

In a first aspect, process 1000 includes transmitting m-DCI identifying the TCI state, wherein the TCI state is associated to the TRP based at least in part on the configuration information, and wherein the configuration information is received via RRC signaling.

In a second aspect, alone or in combination with the first aspect, the configuration information includes a control resource set pool identifier that indicates the TRP associated with the TCI state.

In a third aspect, alone or in combination with one or more of the first and second aspects, process 1000 includes transmitting a single downlink control information including a TCI codepoint identifying a set of TCI states associated with a set of TRPs, wherein the TCI state is associated to the TRP based at least in part on an order of the set of TCI states and an order of the set of TRPs.

In a fourth aspect, alone or in combination with one or more of the first through third aspects, process 1000 includes transmitting a beam failure detection reference signal configuration associating a beam failure detection reference signal with the TRP, wherein the beam failure associated with the TRP is identified based at least in part on the beam failure detection reference signal and an association between the beam failure detection reference signal and the TRP.

In a fifth aspect, alone or in combination with one or more of the first through fourth aspects, communicating with the UE to reset the beam comprises transmitting a BFRR, wherein the beam is reset a threshold period of time after transmitting the BFRR.

In a sixth aspect, alone or in combination with one or more of the first through fifth aspects, the threshold period of time is based at least in part on a subcarrier spacing of at least one of a network device or component carrier to which to receive a beam failure recovery response, a network device or component carrier from which to transmit the BFRR, a network device or component carrier to which to apply a beam reset, or a network device or component carrier for which the beam failure occurred.

In a seventh aspect, alone or in combination with one or more of the first through sixth aspects, a beam reset applies to a fixed set of channels.

In an eighth aspect, alone or in combination with one or more of the first through seventh aspects, a beam reset applies to a set of channels or reference signals associated with the TCI state.

In a ninth aspect, alone or in combination with one or more of the first through eighth aspects, a beam reset applies to a fixed subset of a set of channels or reference signals associated with the TCI state.

In a tenth aspect, alone or in combination with one or more of the first through ninth aspects, a separate downlink TCI and uplink TCI are activated, and a reset beam is applied to one or more channels or reference signals of the downlink TCI only.

In an eleventh aspect, alone or in combination with one or more of the first through tenth aspects, a separate downlink TCI and uplink TCI are activated, and a reset beam is applied to one or more channels or reference signals of the downlink TCI and one or more channels or reference signals of the uplink TCI.

In a twelfth aspect, alone or in combination with one or more of the first through eleventh aspects, the UE is configured to use a statically defined value for a power control configuration for an uplink transmission associated with a reset beam.

In a thirteenth aspect, alone or in combination with one or more of the first through twelfth aspects, communicating with the UE to reset the beam comprises transmitting a secondary primary cell beam failure recovery response, wherein one or more quasi-co-location parameters associated with the TCI state are reset 28 symbols after transmitting the secondary primary cell beam failure recovery response.

In a fourteenth aspect, alone or in combination with one or more of the first through thirteenth aspects, a spatial filter for a physical random access channel transmission is applied to one or more channels or reference signals associated with the TCI state.

In a fifteenth aspect, alone or in combination with one or more of the first through fourteenth aspects, communicating with the UE to reset the beam comprises transmitting a secondary cell beam failure recovery response, wherein one or more quasi-co-location parameters associated with the TCI state are reset 28 symbols after transmitting the secondary cell beam failure recovery response.

In a sixteenth aspect, alone or in combination with one or more of the first through fifteenth aspects, a spatial filter for a physical random access channel transmission is applied to one or more channels or reference signals associated with the TCI state.

In a seventeenth aspect, alone or in combination with one or more of the first through sixteenth aspects, a subcarrier spacing of the 28 symbols is based at least in part on a smallest subcarrier spacing of a first bandwidth part for beam failure recovery response reception and a second bandwidth part for reporting a failed secondary cell.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
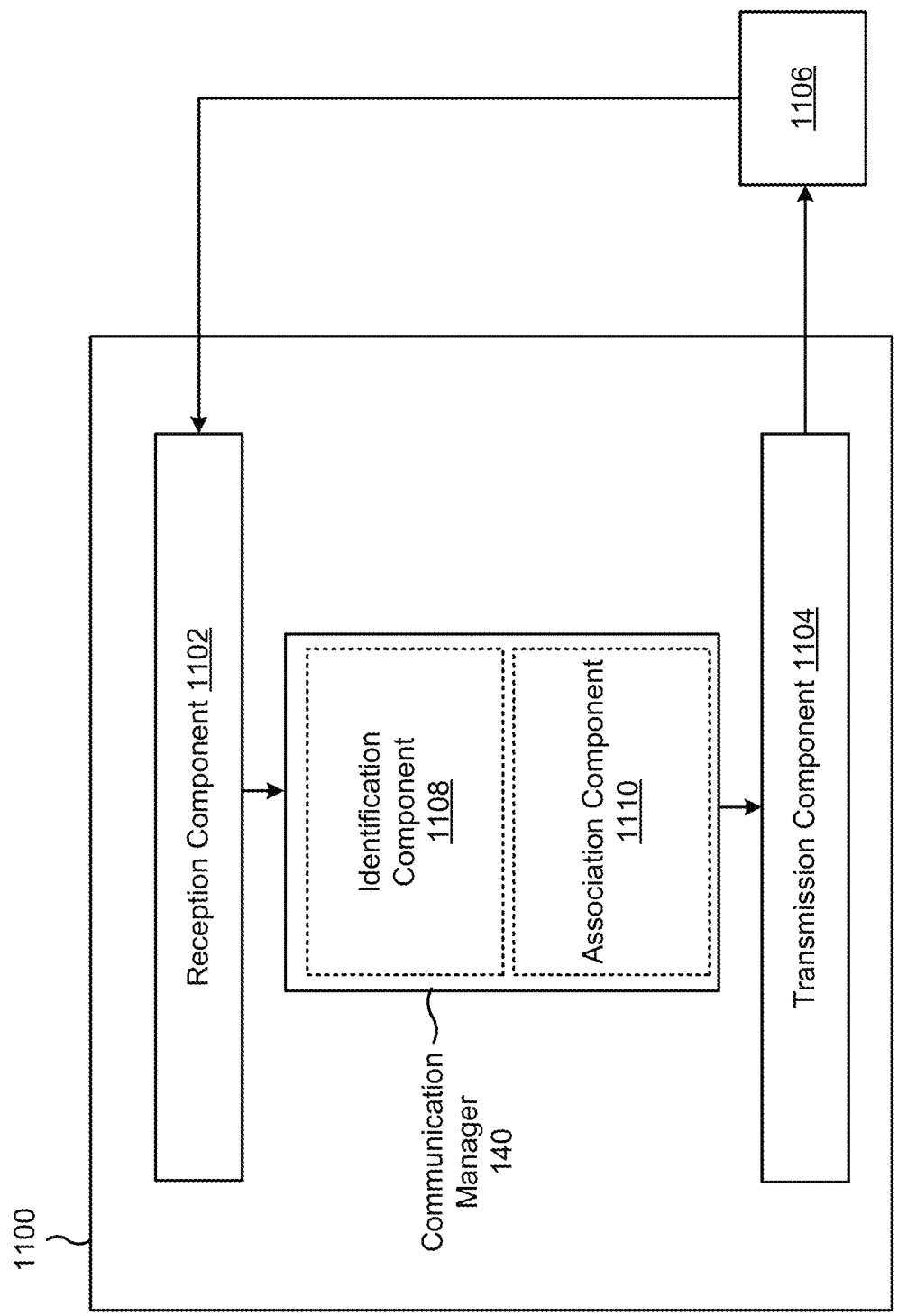
FIGS. 11-12 are diagrams of example apparatuses for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include one or more of an identification component 1108 or an association component 1110, among other examples.

In some aspects, the apparatus 1100 may be configured to perform one or more operations described herein in connection with FIG. 8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive configuration information identifying an association between a TCI state and a TRP. The identification component 1108 may identify a beam failure associated with the TRP. The reception component 1102 and/or the transmission component 1104 may communicate with one or more network devices to reset a beam associated with the beam failure, for the TCI state, based at least in part on the association between the TCI and the TRP. The reception component 1102 may receive m-DCI identifying the TCI state.

The association component 1110 may associate the TCI state with the TRP based at least in part on the configuration information, wherein the configuration information is received via RRC signaling. The reception component 1102 may receive a single downlink control information including a TCI codepoint identifying a set of TCI states associated with a set of TRPs. The association component 1110 may associate the TCI state with the TRP based at least in part on an order of the set of TCI states and an order of the set of TRPs. The reception component 1102 may receive a beam failure detection reference signal configuration associating a beam failure detection reference signal with the TRP.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
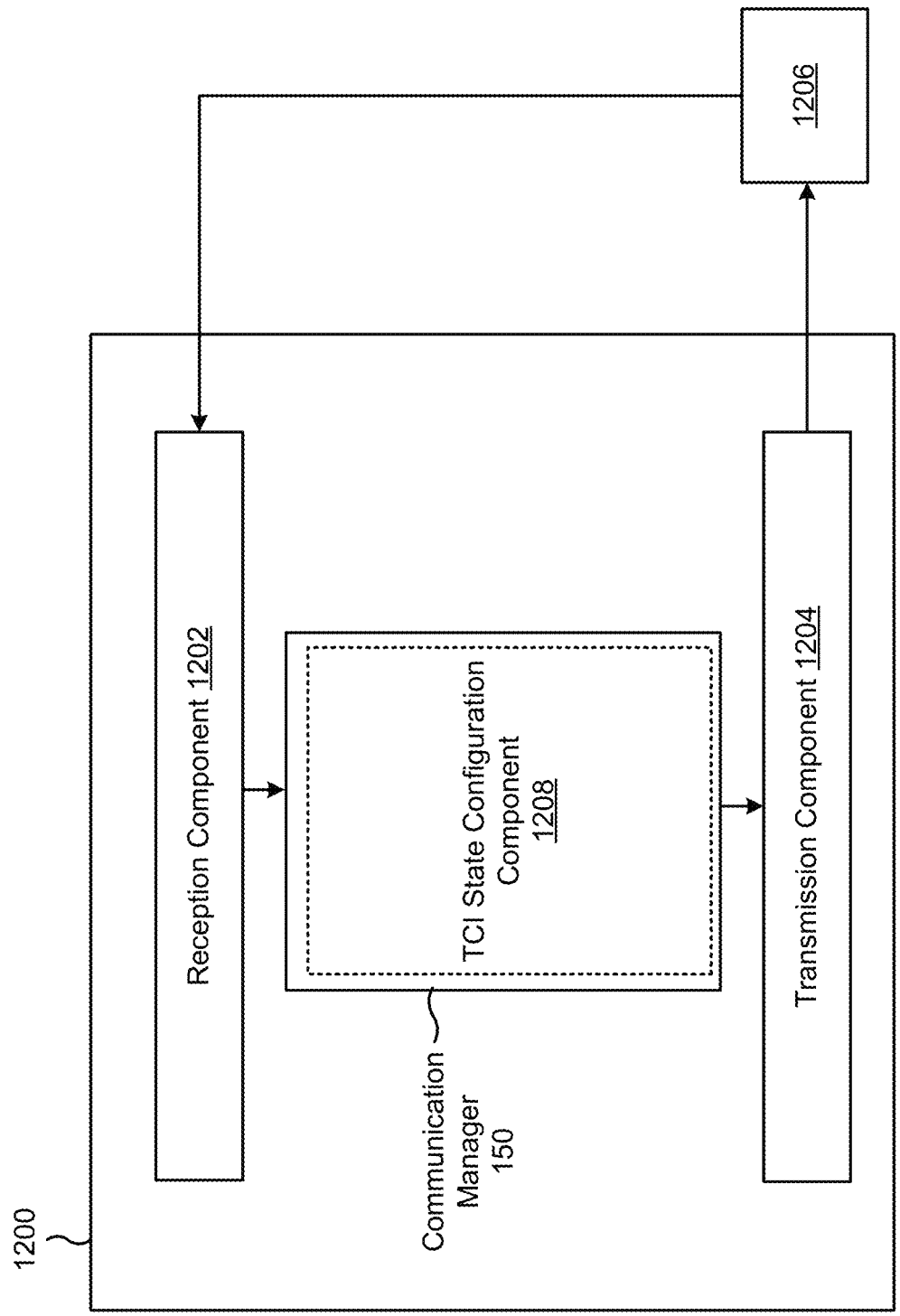

FIG. 12 is a diagram of an example apparatus 1200 for wireless communication. The apparatus 1200 may be a network device (e.g., a base station or TRP thereof), or a network device may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include a TCI state configuration component 1208, among other examples.

In some aspects, the apparatus 1200 may be configured to perform one or more operations described herein in connection with FIG. 8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the base station described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the base station described in connection with FIG. 2. In some aspects, the transmission component 1204 may be co-located with the reception component 1202 in a transceiver.

The transmission component 1204 may transmit configuration information identifying an association between a TCI state and a TRP. The reception component 1202 and/or the transmission component 1204 may communicate with a UE to reset a beam associated with a beam failure, for the TCI state, based at least in part on the association between the TCI and the TRP. The transmission component 1204 may transmit m-DCI identifying the TCI state, wherein the TCI state is associated to the TRP based at least in part on the configuration information, wherein the configuration information is received via RRC signaling.

The transmission component 1204 may transmit a single downlink control information including a TCI codepoint identifying a set of TCI states associated with a set of TRPs, wherein the TCI state is associated to the TRP based at least in part on an order of the set of TCI states and an order of the set of TRPs. The transmission component 1204 may transmit a beam failure detection reference signal configuration associating a beam failure detection reference signal with the TRP, wherein the beam failure associated with the TRP is identified based at least in part on the beam failure detection reference signal and an association between the beam failure detection reference signal and the TRP. TCI state configuration component 1208 may configure a TCI state and cause transmission of information to apparatus 1206 to enable the apparatus 1206 to associate the TCI state with a TRP and/or a beam.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
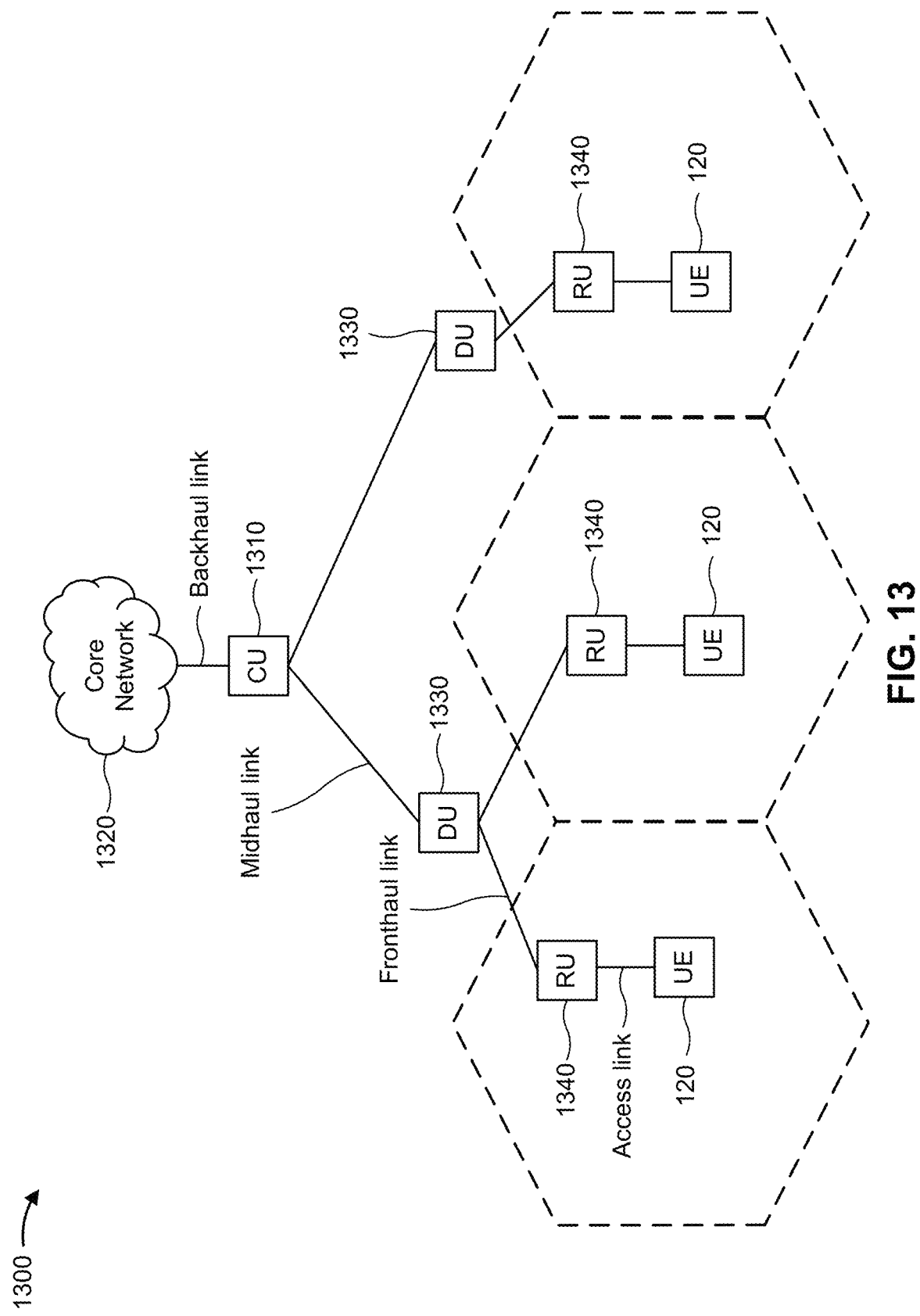
FIG. 13 is a diagram of an open radio access network (O-RAN) architecture, in accordance with the present disclosure.

FIG. 13 is a diagram illustrating an example 1300 of an O-RAN architecture, in accordance with the present disclosure. As shown in FIG. 13, the O-RAN architecture may include a control unit (CU) 1310 that communicates with a core network 1320 via a backhaul link. Furthermore, the CU 1310 may communicate with one or more DUs 1330 via respective midhaul links. The DUs 1330 may each communicate with one or more RUs 1340 via respective fronthaul links, and the RUs 1340 may each communicate with respective UEs 120 via radio frequency (RF) access links. The DUs 1330 and the RUs 1340 may also be referred to as O-RAN DUs (O-DUs) 1330 and O-RAN RUs (O-RUs) 1340, respectively.

In some aspects, the DUs 1330 and the RUs 1340 may be implemented according to a functional split architecture in which functionality of a base station 110 (e.g., an eNB or a gNB) or another network device described herein (e.g., network device 805) is provided by a DU 1330 and one or more RUs 1340 that communicate over a fronthaul link.

Accordingly, as described herein, a base station 110 (or other network device) may include a DU 1330 and one or more RUs 1340 that may be co-located or geographically distributed. In some aspects, the DU 1330 and the associated RU(s) 1340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 1330 may correspond to a logical unit that includes one or more base station functions to control the operation of one or more RUs 1340. For example, in some aspects, the DU 1330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 1310. The RU(s) 1340 controlled by a DU 1330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 1340 handle all over the air (OTA) communication with a UE 120, and real-time and non-real-time aspects of control and user plane communication with the RU(s) 1340 are controlled by the corresponding DU 1330, which enables the DU(s) 1330 and the CU 1310 to be implemented in a cloud-based RAN architecture.

As indicated above, FIG. 13 is provided as an example. Other examples may differ from what is described with regard to FIG. 13.

The following provides an overview of some Aspects of the present disclosure:

Aspect 1: A method of wireless communication performed by a user equipment (UE), comprising: receiving configuration information identifying an association between a transmission configuration indicator (TCI) state and a transmit receive point (TRP); identifying a beam failure associated with the TRP; and communicating with one or more network devices to reset a beam associated with the beam failure, for the TCI state, based at least in part on the association between the TCI and the TRP.

Aspect 2: The method of Aspect 1, further comprising: receiving multi downlink control information (m-DCI) identifying the TCI state; and associating the TCI state with the TRP based at least in part on the configuration information, wherein the configuration information is received via radio resource control (RRC) signaling.

Aspect 3: The method of Aspect 2, wherein the configuration information includes a control resource set pool identifier that indicates the TRP associated with the TCI state.

Aspect 4: The method of any of Aspect 1, further comprising: receiving a single downlink control information including a TCI codepoint identifying a set of TCI states associated with a set of TRPs; and associating the TCI state with the TRP based at least in part on an order of the set of TCI states and an order of the set of TRPs.

Aspect 5: The method of Aspect 4, further comprising: receiving a beam failure detection reference signal configuration associating a beam failure detection reference signal with the TRP; and wherein identifying the beam failure associated with the TRP comprises: identifying the beam failure associated with the TRP based at least in part on the beam failure detection reference signal and an association between the beam failure detection reference signal and the TRP.

Aspect 6: The method of any of Aspects 1 to 5, wherein communicating with the one or more network devices to reset the beam comprises: receiving a beam failure recovery response (BFRR): and resetting the beam a threshold period of time after receiving the BFRR.

Aspect 7: The method of Aspect 6, wherein the threshold period of time is based at least in part on a subcarrier spacing of at least one of: a network device or component carrier to which to send a beam failure recovery response, a network device or component carrier from which to receive the BFRR, a network device or component carrier to which to apply a beam reset, or a network device or component carrier for which the beam failure occurred.

Aspect 8: The method of any of Aspects 1 to 7, wherein a beam reset applies to a fixed set of channels.

Aspect 9: The method of any of Aspects 1 to 7, wherein a beam reset applies to a set of channels or reference signals associated with the TCI state.

Aspect 10: The method of any of Aspects 1 to 7, wherein a beam reset applies to a fixed subset of a set of channels or reference signals associated with the TCI state.

Aspect 11: The method of any of Aspects 1 to 7, wherein a separate downlink TCI and uplink TCI are activated, and wherein a reset beam is applied to one or more channels or reference signals of the downlink TCI only.

Aspect 12: The method of any of Aspects 1 to 7, wherein a separate downlink TCI and uplink TCI are activated, and wherein a reset beam is applied to one or more channels or reference signals of the downlink TCI and one or more channels or reference signals of the uplink TCI.

Aspect 13: The method of any of Aspects 1 to 12, wherein the UE is configured to use a statically defined value for a power control configuration for an uplink transmission associated with a reset beam.

Aspect 14: The method of any of Aspects 1 to 13, wherein communicating with the one or more network devices to reset the beam comprises: receiving a secondary primary cell beam failure recovery response; and resetting one or more quasi-co-location parameters associated with the TCI state 28 symbols after receiving the secondary primary cell beam failure recovery response.

Aspect 15: The method of Aspect 14, wherein a spatial filter for a physical random access channel transmission is applied to one or more channels or reference signals associated with the TCI state.

Aspect 16: The method of any of Aspects 1 to 13, wherein communicating with the one or more network devices to reset the beam comprises: receiving a secondary cell beam failure recovery response; and resetting one or more quasi-co-location parameters associated with the TCI state 28 symbols after receiving the secondary cell beam failure recovery response.

Aspect 17: The method of Aspect 16, wherein a spatial filter for a physical random access channel transmission is applied to one or more channels or reference signals associated with the TCI state.

Aspect 18: The method of any of Aspects 16 to 17, wherein a subcarrier spacing of the 28 symbols is based at least in part on a smallest subcarrier spacing of a first bandwidth part for reception of the secondary cell beam failure recovery response and a second bandwidth part for reporting a failed secondary cell.

Aspect 19: A method of wireless communication performed by a network device, comprising: transmitting configuration information identifying an association between a transmission configuration indicator (TCI) state and a transmit receive point (TRP); communicating with a user equipment (UE) to reset a beam associated with a beam failure, for the TCI state, based at least in part on the association between the TCI and the TRP.

Aspect 20: The method of Aspect 19, further comprising: transmitting multi downlink control information (m-DCI) identifying the TCI state, wherein the TCI state is associated to the TRP based at least in part on the configuration information, wherein the configuration information is received via radio resource control (RRC) signaling.

Aspect 21: The method of Aspect 20, wherein the configuration information includes a control resource set pool identifier that indicates the TRP associated with the TCI state.

Aspect 22: The method of Aspect 19, further comprising: transmitting a single downlink control information including a TCI codepoint identifying a set of TCI states associated with a set of TRPs, wherein the TCI state is associated to the TRP based at least in part on an order of the set of TCI states and an order of the set of TRPs.

Aspect 23: The method of Aspect 22, further comprising: transmitting a beam failure detection reference signal configuration associating a beam failure detection reference signal with the TRP, wherein the beam failure associated with the TRP is identified based at least in part on the beam failure detection reference signal and an association between the beam failure detection reference signal and the TRP.

Aspect 24: The method of any of Aspects 19 to 23, wherein communicating with the UE to reset the beam comprises: transmitting a beam failure recovery response (BFRR), wherein the beam is reset a threshold period of time after transmitting the BFRR.

Aspect 25: The method of Aspect 24, wherein the threshold period of time is based at least in part on a subcarrier spacing of at least one of: a network device or component carrier to which to receive a beam failure recovery response, a network device or component carrier from which to transmit the BFRR, a network device or component carrier to which to apply a beam reset, or a network device or component carrier for which the beam failure occurred.

Aspect 26: The method of any of Aspects 19 to 25, wherein a beam reset applies to a fixed set of channels.

Aspect 27: The method of any of Aspects 19 to 25, wherein a beam reset applies to a set of channels or reference signals associated with the TCI state.

Aspect 28: The method of any of Aspects 19 to 25, wherein a beam reset applies to a fixed subset of a set of channels or reference signals associated with the TCI state.

Aspect 29: The method of any of Aspects 19 to 25, wherein a separate downlink TCI and uplink TCI are activated, and wherein a reset beam is applied to one or more channels or reference signals of the downlink TCI only.

Aspect 30: The method of any of Aspects 19 to 25, wherein a separate downlink TCI and uplink TCI are activated, and wherein a reset beam is applied to one or more channels or reference signals of the downlink TCI and one or more channels or reference signals of the uplink TCI.

Aspect 31: The method of any of Aspects 19 to 30, wherein the UE is configured to use a statically defined value for a power control configuration for an uplink transmission associated with a reset beam.

Aspect 32: The method of any of Aspects 19 to 31, wherein communicating with the UE to reset the beam comprises: transmitting a secondary primary cell beam failure recovery response, wherein one or more quasi-co-location parameters associated with the TCI state are reset 28 symbols after transmitting the secondary primary cell beam failure recovery response.

Aspect 33: The method of Aspect 32, wherein a spatial filter for a physical random access channel transmission is applied to one or more channels or reference signals associated with the TCI state.

Aspect 34: The method of any of Aspects 19 to 31, wherein communicating with the UE to reset the beam comprises: transmitting a secondary cell beam failure recovery response, wherein one or more quasi-co-location parameters associated with the TCI state are reset 28 symbols after transmitting the secondary cell beam failure recovery response.

Aspect 35: The method of Aspect 34, wherein a spatial filter for a physical random access channel transmission is applied to one or more channels or reference signals associated with the TCI state.

Aspect 36: The method of any of Aspects 34 to 35, wherein a subcarrier spacing of the 28 symbols is based at least in part on a smallest subcarrier spacing of a first bandwidth part for beam failure recovery response reception and a second bandwidth part for reporting a failed secondary cell.

Aspect 37: An apparatus for wireless communication at a device, comprising a processor; memory coupled with the processor; and instructions stored in the memory and executable by the processor to cause the apparatus to perform the method of one or more of Aspects 1-18.

Aspect 38: A device for wireless communication, comprising a memory and one or more processors coupled to the memory, the one or more processors configured to perform the method of one or more of Aspects 1-18.

Aspect 39: An apparatus for wireless communication, comprising at least one means for performing the method of one or more of Aspects 1-18.

Aspect 40: A non-transitory computer-readable medium storing code for wireless communication, the code comprising instructions executable by a processor to perform the method of one or more of Aspects 1-18.

Aspect 41: A non-transitory computer-readable medium storing a set of instructions for wireless communication, the set of instructions comprising one or more instructions that, when executed by one or more processors of a device, cause the device to perform the method of one or more of Aspects 1-18.

Aspect 42: An apparatus for wireless communication at a device, comprising a processor; memory coupled with the processor; and instructions stored in the memory and executable by the processor to cause the apparatus to perform the method of one or more of Aspects 19-36.

Aspect 43: A device for wireless communication, comprising a memory and one or more processors coupled to the memory, the one or more processors configured to perform the method of one or more of Aspects 19-36.

Aspect 44: An apparatus for wireless communication, comprising at least one means for performing the method of one or more of Aspects 19-36.

Aspect 45: A non-transitory computer-readable medium storing code for wireless communication, the code comprising instructions executable by a processor to perform the method of one or more of Aspects 19-36.

Aspect 46: A non-transitory computer-readable medium storing a set of instructions for wireless communication, the set of instructions comprising one or more instructions that, when executed by one or more processors of a device, cause the device to perform the method of one or more of Aspects 19-36.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
 a memory; and
 one or more processors, coupled to the memory, configured to:
  receive configuration information identifying an association between a transmission configuration indicator (TCI) state and a transmit receive point (TRP);
  identify a beam failure associated with the TRP; and
  communicate with one or more network devices to reset a beam associated with the beam failure for the TCI state without resetting other beams associated with the TRP, based at least in part on the association between the TCI state and the TRP.

2. The UE of claim 1, wherein the one or more processors are further configured to:
 receive multi downlink control information (m-DCI) identifying the TCI state; and
 associate the TCI state with the TRP based at least in part on the configuration information, wherein the configuration information is received via radio resource control (RRC) signaling.

3. The UE of claim 2, wherein the configuration information includes a control resource set pool identifier that indicates the TRP associated with the TCI state.

4. The UE of claim 1, wherein the one or more processors are further configured to:
 receive a single downlink control information including a TCI codepoint identifying a set of TCI states associated with a set of TRPs; and
 associate the TCI state with the TRP based at least in part on an order of the set of TCI states and an order of the set of TRPs.

5. The UE of claim 4, wherein the one or more processors are further configured to:
 receive a beam failure detection reference signal configuration associating a beam failure detection reference signal with the TRP; and
 wherein the one or more processors, to identify the beam failure associated with the TRP, are configured to:
  identify the beam failure associated with the TRP based at least in part on the beam failure detection reference signal and an association between the beam failure detection reference signal and the TRP.

6. The UE of claim 1, wherein the one or more processors, to communicate with the one or more network devices to reset the beam, are configured to:
 receive a beam failure recovery response (BFRR); and
 reset the beam a threshold period of time after receiving the BFRR.

7. The UE of claim 6, wherein the threshold period of time is based at least in part on a subcarrier spacing of at least one of:
 a network device or component carrier to which to send a beam failure recovery response,
 a network device or component carrier from which to receive the BFRR,
 a network device or component carrier to which to apply a beam reset, or
 a network device or component carrier for which the beam failure occurred.

8. The UE of claim 1, wherein a beam reset applies to a fixed set of channels.

9. The UE of claim 1, wherein a beam reset applies to a set of channels or reference signals associated with the TCI state.

10. The UE of claim 1, wherein a beam reset applies to a fixed subset of a set of channels or reference signals associated with the TCI state.

11. The UE of claim 1, wherein a separate downlink TCI and uplink TCI are activated, and
 wherein a reset beam is applied to one or more channels or reference signals of the downlink TCI only.

12. The UE of claim 1, wherein a separate downlink TCI and uplink TCI are activated, and
 wherein a reset beam is applied to one or more channels or reference signals of the downlink TCI and one or more channels or reference signals of the uplink TCI.

13. The UE of claim 1, wherein the UE is configured to use a statically defined value for a power control configuration for an uplink transmission associated with a reset beam.

14. The UE of claim 1, wherein the one or more processors, to communicate with the one or more network devices to reset the beam, are configured to:
 receive a secondary primary cell beam failure recovery response; and
 reset one or more quasi-co-location parameters associated with the TCI state 28 symbols after receiving the secondary primary cell beam failure recovery response.

15. The UE of claim 14, wherein a spatial filter for a physical random access channel transmission is applied to one or more channels or reference signals associated with the TCI state.

16. A network device for wireless communication, comprising:
 a memory; and
 one or more processors, coupled to the memory, configured to:
  transmit configuration information identifying an association between a transmission configuration indicator (TCI) state and a transmit receive point (TRP); and
  communicate with a user equipment (UE) to reset a beam associated with a beam failure for the TCI state without resetting other beams associated with the TRP, based at least in part on the association between the TCI state and the TRP.

17. The network device of claim 16, wherein the one or more processors, to communicate with the UE to reset the beam, are configured to:
 transmit a beam failure recovery response (BFRR), wherein the beam is reset a threshold period of time after transmitting the BFRR.

18. The network device of claim 16, wherein a beam reset applies to a fixed subset of a set of channels or reference signals associated with the TCI state.

19. The network device of claim 16, wherein a separate downlink TCI and uplink TCI are activated, and
 wherein a reset beam is applied to one or more channels or reference signals of the downlink TCI only.

20. A method of wireless communication performed by a user equipment (UE), comprising:

receiving configuration information identifying an association between a transmission configuration indicator (TCI) state and a transmit receive point (TRP);
identifying a beam failure associated with the TRP; and
communicating with one or more network devices to reset a beam associated with the beam failure for the TCI state without resetting other beams associated with the TRP, based at least in part on the association between the TCI state and the TRP.

* * * * *